(12) United States Patent
Harchol-Balter et al.

(10) Patent No.: US 9,052,895 B2
(45) Date of Patent: Jun. 9, 2015

(54) POWER BUDGET ALLOCATION IN MULTI-PROCESSOR SYSTEMS

(75) Inventors: Mor Harchol-Balter, Pittsburgh, PA (US); Anshul Gandhi, Pittsburgh, PA (US); Rajarshi Das, Armonk, NY (US); Jeffrey Kephart, Hawthorne, NY (US)

(73) Assignees: International Business Machines, Armonk, NY (US); Carnegie Mellon University, Pittsburgh, PA (US)

( * ) Notice: Subject to any disclaimer, the term of this patent is extended or adjusted under 35 U.S.C. 154(b) by 735 days.

(21) Appl. No.: 13/082,144

(22) Filed: Apr. 7, 2011

(65) Prior Publication Data

US 2012/0084580 A1  Apr. 5, 2012

Related U.S. Application Data

(60) Provisional application No. 61/341,922, filed on Apr. 7, 2010.

(51) Int. Cl.
| | |
|---|---|
| *G06F 1/26* | (2006.01) |
| *G06F 1/32* | (2006.01) |
| *G06F 3/00* | (2006.01) |
| *G06F 9/48* | (2006.01) |
| *G06F 9/50* | (2006.01) |

(52) U.S. Cl.
CPC ............ *G06F 1/3203* (2013.01); *G06F 9/4893* (2013.01); *G06F 1/3206* (2013.01); *G06F 1/32* (2013.01); *G06F 1/3228* (2013.01); *G06F 1/324* (2013.01); *G06F 1/329* (2013.01); *G06F 9/5094* (2013.01); *Y02B 60/14* (2013.01); *G06F 1/3296* (2013.01); *Y02B 60/10* (2013.01); *G06F 9/4881* (2013.01); *Y02B 60/1282* (2013.01); *Y02B 60/1278* (2013.01); *Y02B 60/1217* (2013.01); *Y02B 60/144* (2013.01); *Y02B 60/142* (2013.01)

(58) Field of Classification Search
None
See application file for complete search history.

(56) References Cited

U.S. PATENT DOCUMENTS

| | | | |
|---|---|---|---|
| 7,484,111 B2 | 1/2009 | Fung | |
| 2010/0235840 A1* | 9/2010 | Angaluri | 718/102 |
| 2011/0022868 A1* | 1/2011 | Harchol-Balter et al. | 713/323 |
| 2011/0022871 A1* | 1/2011 | Bouvier et al. | 713/340 |
| 2012/0084580 A1* | 4/2012 | Harchol-Balter et al. | 713/310 |

* cited by examiner

*Primary Examiner* — Tanh Nguyen
(74) *Attorney, Agent, or Firm* — Downs Rachlin Martin PLLC

(57) ABSTRACT

Systems, apparatuses, methods, and software that implement power budget allocation optimization algorithms in multi-processor systems, such as server farms. The algorithms are derived from a queuing theoretic model that minimizes the mean response time of the system to the jobs in the workload while accounting for a variety of factors. These factors include, but are not necessarily limited to, the type of power (frequency) scaling mechanism(s) available within the processors in the system, the power-to-frequency relationship(s) of the processors for the scaling mechanism(s) available, whether or not the system is an open or closed loop system, the arrival rate of jobs incoming into the system, the number of jobs within the system, and the type of workload being processed.

27 Claims, 17 Drawing Sheets

POWER BUDGET ALLOCATION IN MULTI-PROCESSOR SYSTEMS

RELATED APPLICATION DATA

This application claims the benefit of priority of U.S. Provisional Patent Application Ser. No. 61/341,922, filed Apr. 7, 2010, and titled "Optimal Power Allocation In Server Farms," which is incorporated by reference herein in its entirety.

STATEMENT REGARDING FEDERALLY SPONSORED RESEARCH AND DEVELOPMENT

This invention was made in part with government support under National Science Foundation SMA/PDOS Grant CCR-0615262. The United States Government may have certain rights in this invention.

FIELD OF THE INVENTION

The present invention generally relates to the field of managing power and performance of computing devices. In particular, the present invention is directed to power budget allocation in multi-processor systems.

BACKGROUND

For some time now, the amount of power consumed by servers has been increasing, as has the number of servers placed in various facilities. Servers today consume ten times more power than they did ten years ago. The U.S. Environmental Protection Agency estimated that in 2006 the nation's servers and data centers collectively consumed approximately 61 billion kilowatt-hours, or 1.5% of total U.S. electricity consumption, at a total cost of approximately $4.5 billion. This level represents a doubling in the level of energy consumption by data centers in the five years since 2001; and the level is expected to double again by 2011 as more and more applications shift from the desktop to a server-based computing paradigm. Already there are large server farms comprising a million or more servers. Globally, it has been estimated that the worldwide expenditure on enterprise power and cooling of servers is in excess of $30 billion.

Driving the overall growth in server farms is the increased capacity required to run Internet-based businesses. In addition to the growth in traditional Web-based service providers, a revolution is currently taking place in the $120 billion software industry that will further drive the demand for server resources. Software applications that traditionally have been installed on personal computers are being deployed over the Internet under the software-as-a-service (SaaS) model.

Server farms usually have a fixed peak power budget. This is because large power consumers operating server farms are often billed by power suppliers, in part, based on their peak power requirements. The peak power budget of a server farm also determines its cooling and power delivery infrastructure costs. Hence, companies are interested in maximizing the performance at a server farm given a fixed power budget.

SUMMARY OF THE DISCLOSURE

In one implementation, the present disclosure is directed to a method of allocating a fixed power budget P among a number k of computers arranged in a system to process incoming jobs collectively, wherein k is greater than one and each of the k computers has an operating state. The method includes determining a desired frequency/power state for each of the k computers based on a queuing theoretic model; and controlling the operating state of each of the k computers based on the desired frequency/power state for that one of the k computers.

In another implementation, the present disclosure is directed to a machine-readable storage medium containing machine-executable instructions for performing a method of allocating a fixed power budget P among a number k of computers arranged in a system to process incoming jobs collectively, wherein k is greater than one and each of the k computers has an operating state. The machine-executable instructions include a first set of machine-executable instructions for determining a desired frequency/power state for each of the k computers based on a queuing theoretic model; and a second set of machine-executable instructions for controlling the operating state of each of the k computers based on the desired frequency/power state for that one of the k computers.

In still another implementation, the present disclosure is directed to a system for processing incoming jobs. The system includes a number k of computers arranged to process incoming jobs collectively, wherein k is greater than one and each of the k computers has an operating state that can be selectively set based on a selecting signal; and a router designed and configured to: receive the incoming jobs; determine a desired frequency/power state for each of the k computers based on a queuing theoretic model; provide the selecting signal to each of the k computers as a function of the queuing theoretic model; and allocate the incoming jobs based on the number of the k computers operating as a result of the application of the queuing theoretic model.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
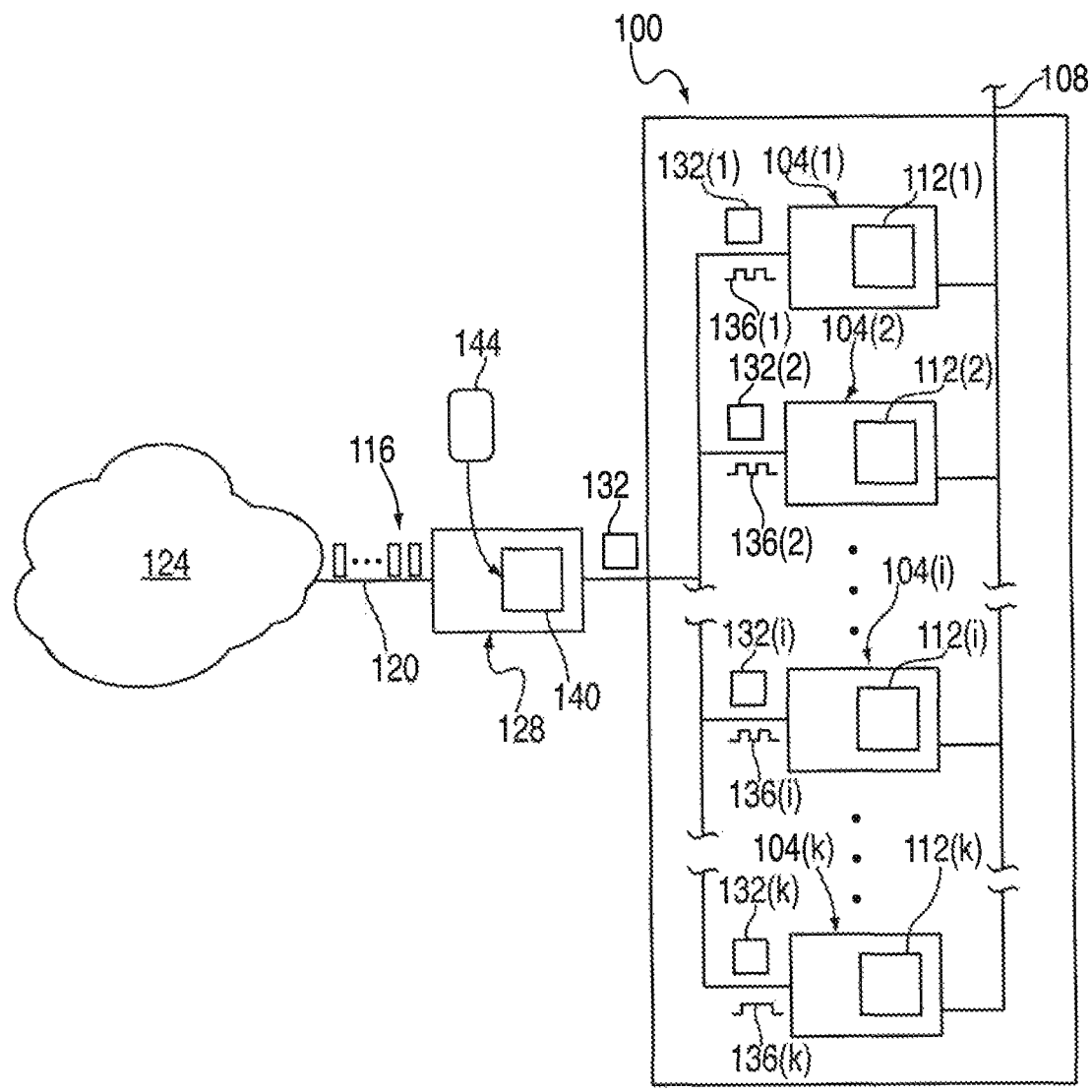
FIG. 1 is a high-level block diagram of an exemplary multi-processor system that utilizes a power budget allocation optimization method.

Aspects of the present invention are directed to optimizing allocation of a fixed power budget in a multi-processor system, such as a server farm, that processes streams of jobs coming into the system. Some of these aspects are directed to a power allocation optimization scheme that implements a queuing theoretic model that minimizes the mean time for executing the incoming jobs. The queuing theoretic model accounts for a number of factors, such as the power-to-frequency relationship of the processors in the system, the arrival rate of the jobs, the power budget, among others, that affect the mean response time of the system, i.e., the mean time that it takes the processors within the system to complete the incoming jobs, and leverages the ability to selectively control the operating frequencies of the individual processors in a way that minimizes the mean response time for a given power budget. These and other aspects of the present invention are described and exemplified below.

Before proceeding with describing aspects of the present invention and various embodiments thereof, it is useful to define terminology used herein and in the appended claims and to provide the reader with some context for understanding these aspects and embodiments. As used herein and in the appended claims, the term "computer" and like terms shall include a machine that includes one or more microprocessors (e.g., a single-processor server, a multi-processor server, a multi-processor server blade, etc.) and is a programmable machine designed to sequentially and automatically carry out a sequence of arithmetic and/or logical operations and has multiple operating states. A "computing system" refers to a combination of hardware (processor, memory, devices, etc.) and software (operating system, programs, drivers, etc.) designated for running on that hardware and/or controlling or otherwise interacting with that hardware. A "workload" denotes one or more tasks, or "jobs," defined by an application or other software running on a particular computing system. A workload consists essentially of workload instructions that are executed by the processor and any data accompanying the workload instructions.

As will be understood from reading this entire disclosure, a feature of many current and future processors is/will be the ability to control the amount of power they consume. Today's processors are commonly equipped with mechanisms to reduce power consumption at the expense of processing speed, which is the frequency at which a processor operates when processing a workload. Common examples of these mechanisms are the SPEEDSTEP® technology used on certain processors available from Intel Corporation, Mountain View, Calif., and the COOL'N'QUIET™ technology used on certain processors available from Advanced Micro Devices, Inc., Sunnyvale, Calif. The power-to-frequency relationship in such processors depends on the specific power/frequency scaling mechanism used. Most mechanisms currently used fall under one of the follow three categories: 1) dynamic frequency scaling (DFS) (a.k.a. "clock throttling" and "T-states"); 2) dynamic voltage and frequency scaling (DVFS) (a.k.a. "P-states"); and 3) DVFD+DVS. It is noted that these three mechanisms are exemplary and that the particular mechanism used to reduce power consumption (and speed) in any particular case is important essentially only from the perspective of magnitude of power savings and impact of processing speed.

As used herein and in the appended claims, an "operating state" of a processor is a state in which the processor is either in a "processing state" in which it is processing workload instructions or is in a "non-processing state" that the processor can recover from quickly, for example, within a few clock cycles. An example of such a non-processing operating state is an idle state. For convenience, several operating states, namely, a "PowMin" state, a "PowMax" state, a "PowMed" state, and a "ZeroPower" state, are particularly defined for use herein and in the appended claims. The "PowMin" state is the lowest-power operating state that the processor can be set to for processing a workload. When in the PowMin state, the processor is consuming the minimum amount of power and is running at the lowest frequency, or "speed." The "PowMax" state is the highest-power operating state that the processor can be set to for processing a workload. When in the PowMax state, the processor is consuming the maximum amount of power and is running at its highest speed. Typically, the speed of the processor in the PowMax state is its rated speed. The "PowMed" state is an operating state having a power consumption between the PowMin and PowMax states. Correspondingly, the processor speed in the PowMed state falls between the processor speeds of the PowMin and PowMax states. The ZeroPower state is a non-processing state in which the power consumption of the processor is relatively very low compared to the PowMin processing state. While it is recognized that the actual power consumption of the processor in the ZeroPower state is not zero, the term "ZeroPower" is used for convenience and effect. Those skilled in the art will readily understand how to correlate the defined PowMin, PowMax, and PowMed states to the various processing states selectable within the particular processor(s) under consideration. Likewise, skilled artisans will be able to correlate the ZeroPower state to one or more of the selectable non-processing state(s) available on the particular processor(s) at issue.

Referring now to the drawings, FIG. 1 illustrates an exemplary multi-computer processing system, which in this case is a web-server farm 100 that includes multiple computers, here servers 104(1) through 104(*k*), or servers 104(1)-(*k*) for short. Servers 104(1)-(*k*) are powered by a server-power network 108 that is subjected to a fixed power budget, P, that is considered in the power allocation optimization scheme disclosed herein. In this example, each server 104(1)-(*k*) includes, among other things not shown, one or more processors, represented by corresponding respective processing blocks 112(1) through 112(*k*), or blocks 112(1)-(*k*) for short. Web-server farm 100 receives incoming jobs 116, in this case from a connection 120 to the Internet 124. As can be imagined, incoming jobs 116 can be any jobs relating to the functionality provided by server farm 100, which can be any functionality that can be accessed via the Internet 124, such as search engine functionality, website hosting functionality, software as a service functionality, email/messaging functionality, data storage functionality, etc., and any combination thereof.

Incoming jobs 116 are received by one or more router(s), collectively represented by router 128, which is designed and configured to allocate the workload 132 (which equals the sum of workload portions 132(1) through 132(*k*)) corresponding to the incoming jobs among some or all of servers 104(1)-(*k*), depending on the state of the system, i.e., the state of server farm 100. In this connection, each of the processors in processing blocks 112(1)-(*k*) has a number of selectable power states, in this case a PowMin state, a PowMax state, at least one PowMed state, and a ZeroPower state. These states are selectable via appropriate signals, referred to as operating state signals 136(1) through 136(*k*) (136(1)-(*k*) for short). Depending on the configuration of the processor(s) at issue, the operating state signals can be provided to the processors in any of a variety of ways, such as by a digital code, activation of one or more selection lines, or a combination thereof. The particular manner in which operating states are selected within a particular processor is not important to the breadth of this disclosure and enablement of the claims, since anyone skilled in the art will understand how to implement aspects of the present invention for any type of selection mechanism provided.

Correspondingly, router 128 executes a power budget allocation optimization algorithm 140 that is based on a queuing model 144 and is used to control the operating states of processing blocks 112(1)-(*k*) so as to minimize the mean response time of server farm 100 and, therefore, optimize the allocation of the fixed power budget among the multiple servers 104(1)-(*k*). Outputs of router 128 based on the execution of algorithm 140 include operating state signals provided correspondingly respectively to servers 104(1)-(*k*) and portions of the workload provided to corresponding respective ones of the servers that router 128 has designated to be in a processing state.

Figure 2:
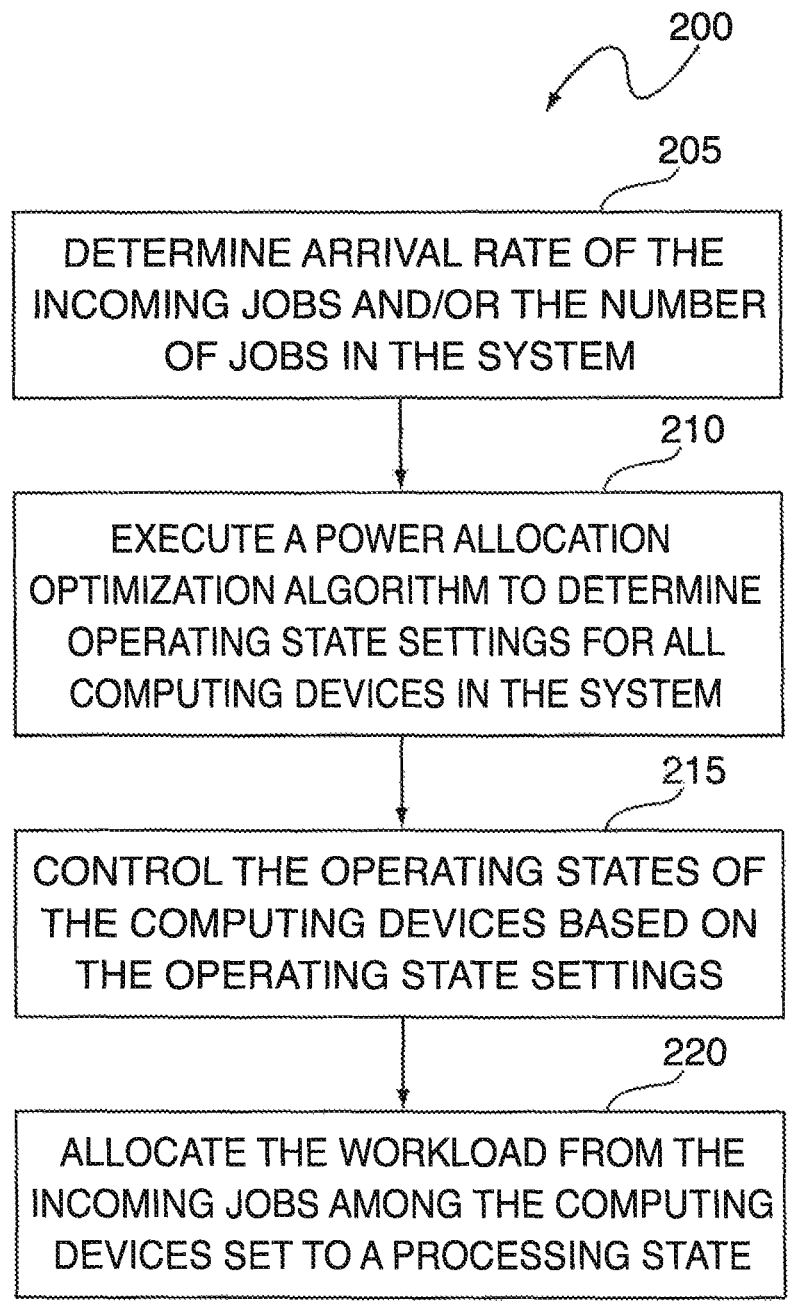
FIG. 2 is a flow diagram illustrating a power budget allocation optimization method that can be used in the multi-processor system of FIG. 1.

FIG. 2 illustrates a method 200 that can be used to optimize the allocation of a power budget within a multi-processor system, such as server farm 100 of FIG. 1. For convenience, method 200 is described in connection with FIG. 1. However, it is noted that method 200 of FIG. 2 can be implemented in other multi-processor systems, as well.

Referring now to FIG. 2, and also to FIG. 1, depending on the state of server farm 100, at step 205 router 128 determines the arrival rate of incoming jobs 116 and/or the number of jobs in the server farm, for example, in a manner known in the art. For example, and as exemplified below in detail, if server farm 100 is operating in an open loop configuration, the arrival rate of incoming jobs 116 is a variable within algorithm 132. However, if server farm 100 is operating in a closed loop configuration, the number of jobs in the server farm is a factor in algorithm 140. Open loop and closed loop configurations are described below.

At step 210, router 128 executes power budget allocation optimization algorithm 140 so as to determine operating state settings for all of the computer devices within the multi-processor system at issue, here servers 104(1)-(*k*) within server farm 100. As will be seen below, algorithm 140 can be derived from queuing theoretic model 144 that accounts for a number of parameters concerning the system, here server farm 100. Generally, algorithm 140 uses the information determined in step 205 in determining the optimal power budget allocation. Detailed examples of algorithms that can be used as algorithm 140 are presented below, as are guidelines for deriving similar algorithms, depending on the nature of the workload that processors in a particular multi-processor system is handling.

At step 215, router 128 controls the operating states of the computers (servers 104(1)-(*k*)) based on the operating state settings determined in step 210. In the present example of server farm 100 of FIG. 1, this is accomplished using operating state signals 136(1)-(*k*) that are generated by router 128 based on the results of executing algorithm 140. Using the four power states mentioned above, each signal will be configured to cause the corresponding server 104(1)-(*k*) to operate at the desired one of the PowMin, PowMax, PowMed, and ZeroPower states. At step 220, router 128 allocates the workload from incoming jobs 116 to the one(s) of servers 104(1)-(*k*) that is/are in one of the processing states, here, any one of the PowMin, PowMax, and PowMed states. As will be seen below, depending on the nature of algorithm 140 used and the state of server farm 100, one or more of servers 104(1)-(*k*) might be set to a non-processing state (here, set to the ZeroPower state) for a given workload and/or set of system parameters. In such a case, the workload allocation at step 220 will not include the servers set to such non-processing state. As those skilled in the art will readily appreciate, method 200 will typically be implemented in a looped manner so that the power allocation among servers 104(1)-(*k*) can be continually optimized as overall workload 132 within server farm 100 changes over time.

Figure 3A:
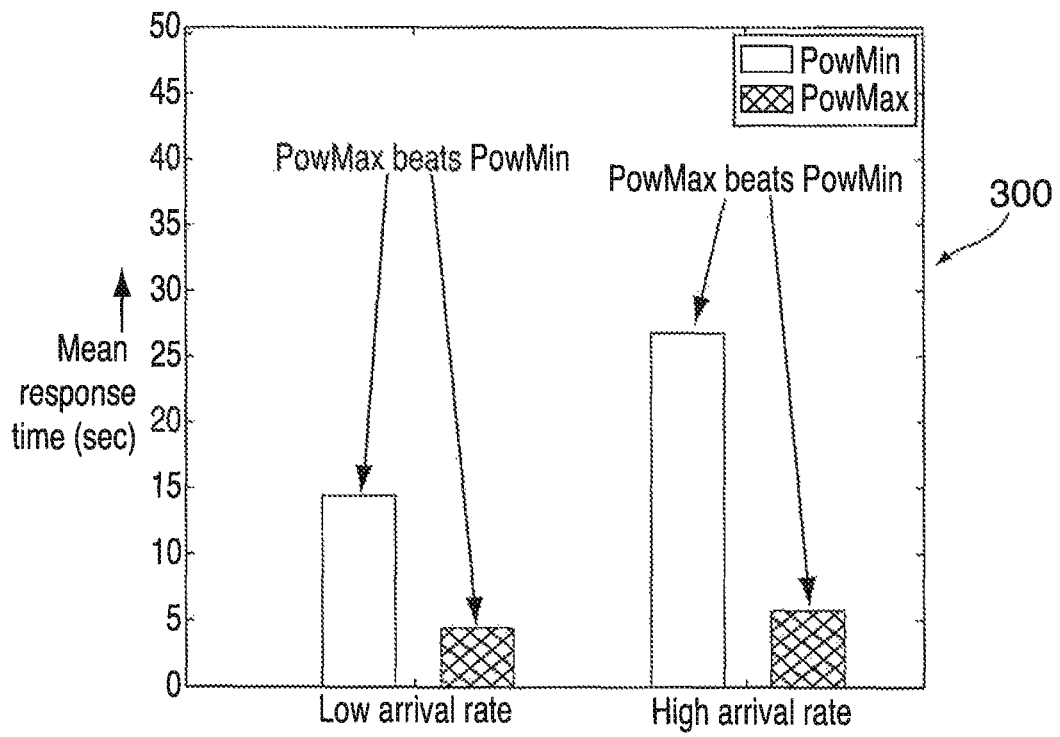
FIG. 3A is a bar chart illustrating an exemplary scenario using DFS wherein the PowMax allocation is optimal for both high and low arrival rates.
Figure 3B:
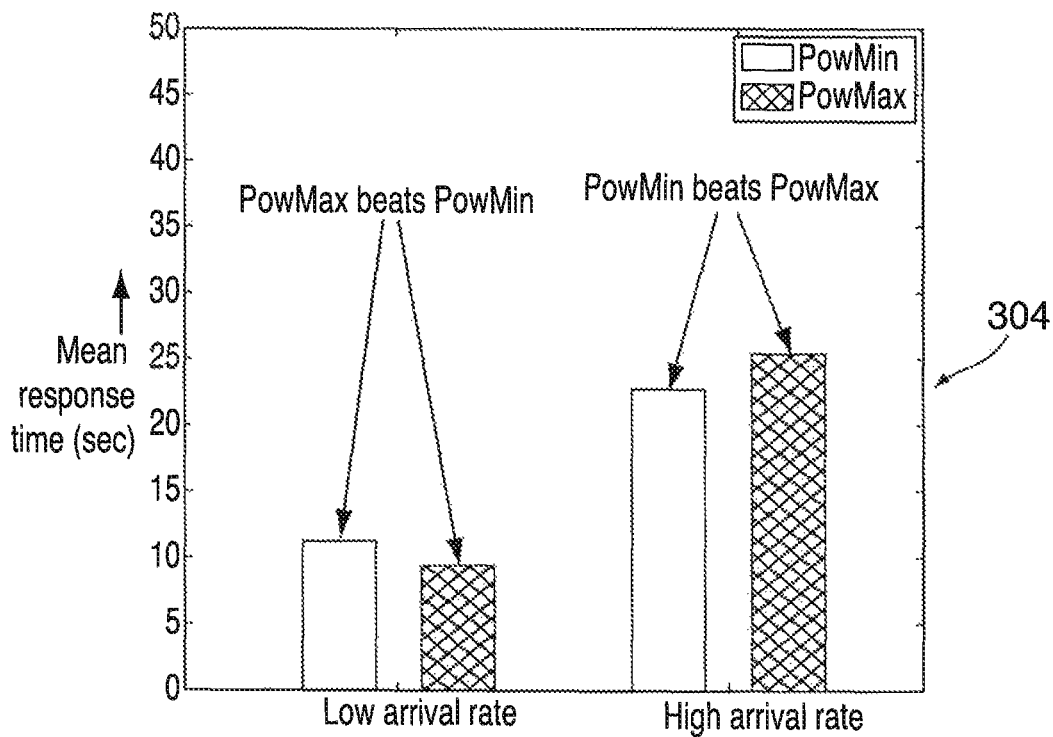
FIG. 3B is a bar chart illustrating an exemplary scenario using DVFS wherein the PowMin allocation is optimal for high arrival rates and the PowMax allocation is optimal for low arrival rates.
Figure 3C:
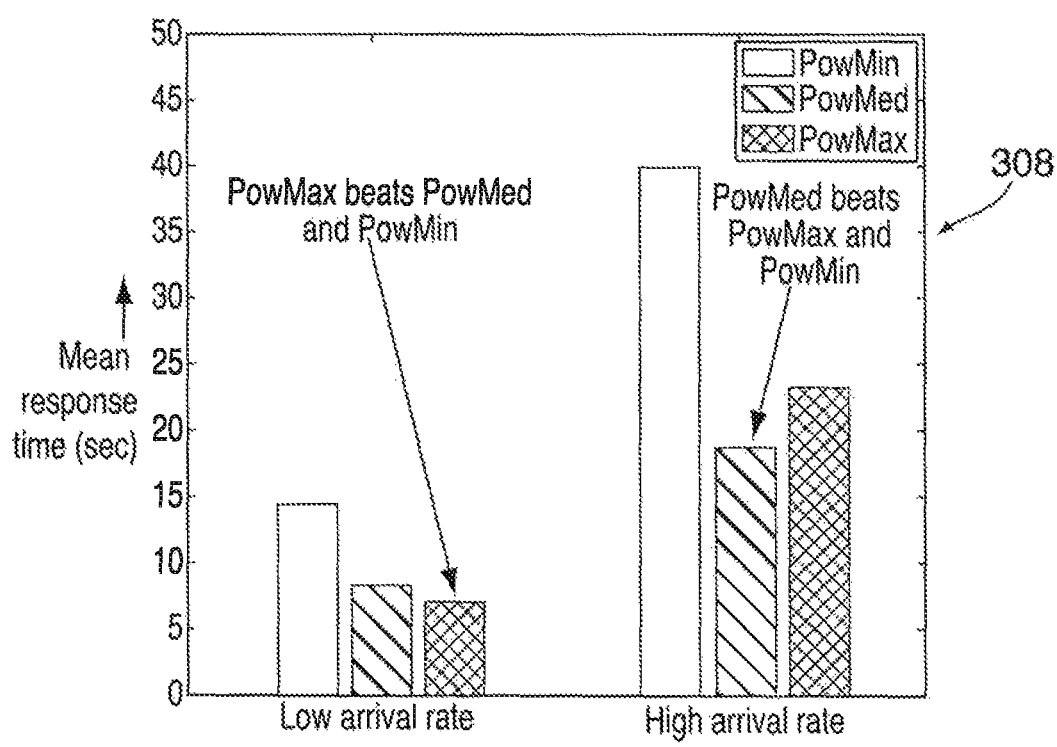
FIG. 3C is a bar chart illustrating an exemplary scenario using DVFS+DFS wherein the PowMed allocation is optimal for a high number of jobs in the system and the PowMax allocation is optimal for a low number of jobs in the system.

Before proceeding with describing particular algorithms that can be implemented in a multi-processor system, for example, as algorithm 140 within router 128 of server farm 100 of FIG. 1, several examples of results that can be achieved by implementing a power budget allocation optimization method that is in accordance with the present disclosure are first provided with reference to FIGS. 3A to 3C. Referring now to these figures, it is seen that no single power budget allocation scheme is optimal. FIG. 3A is a bar chart 300 for DFS that depicts a scenario in which a PowMax allocation (i.e., an allocation in which all processors in a processing state are set to the PowMax state) is optimal at both high arrival rates and low arrival rates. FIG. 3B is a bar chart 304 that depicts a scenario using DVFS in which a PowMin allocation (i.e., an allocation in which all processors in a processing state are set to the PowMin state) is optimal for high arrival rates but the PowMax allocation is optimal for low arrival rates. FIG. 3C is a bar chart 308 depicting a scenario using DVFS+ DFS in which a PowMed allocation (i.e., an allocation in which all processors in a processing state are set to the PowMed state) is optimal at high arrival rates but the PowMax allocation is optimal at low arrival rates. The nature of bar charts 300, 304, 308 will become clear upon learning more about the power budget allocation algorithms used to create these charts in the description below.

Queuing Model

Figure 4:
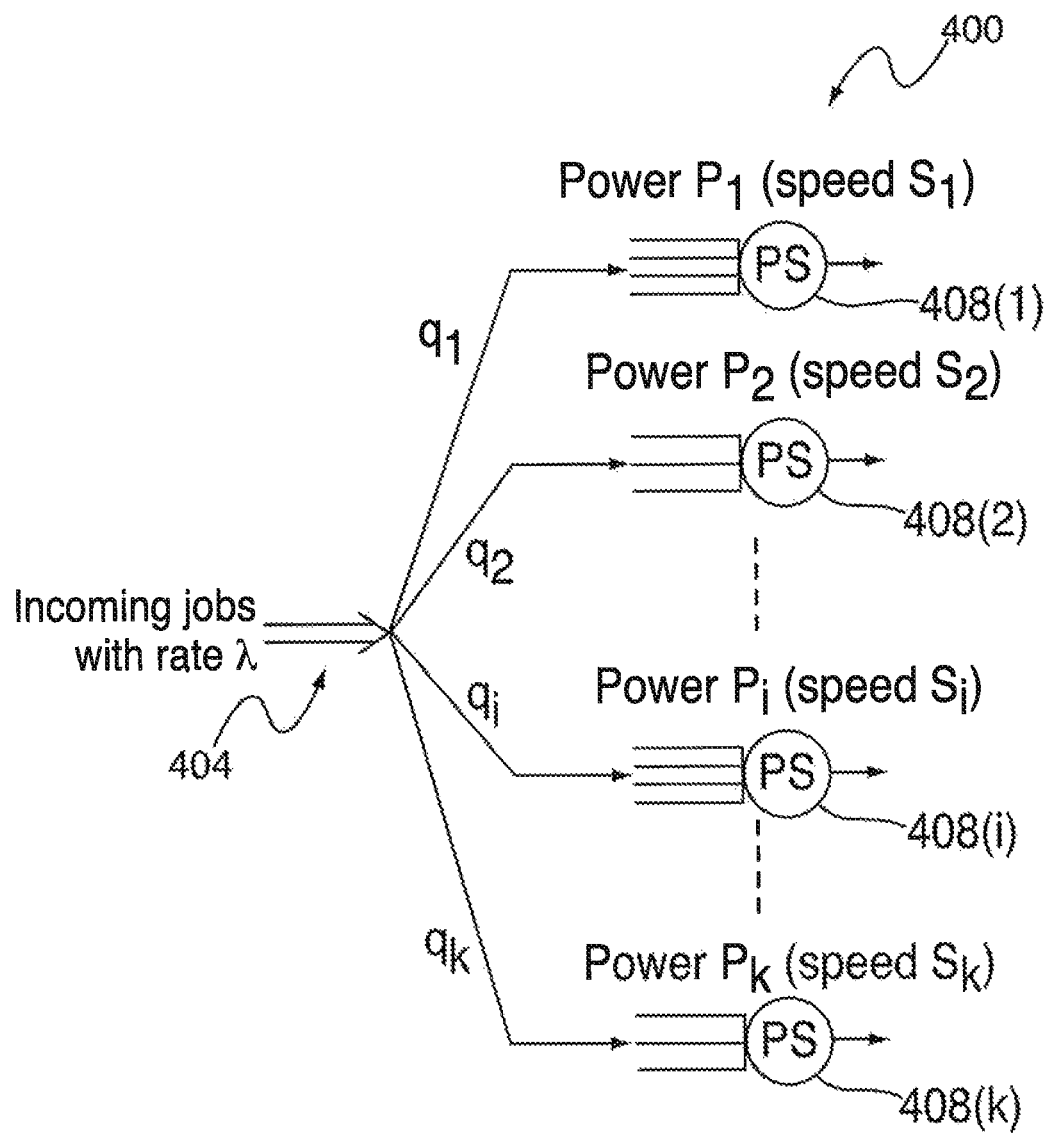
FIG. 4 is a diagram of a queuing theoretic model used to derive power budget allocation optimization algorithms that can be used in the method of FIG. 2.

As mentioned above, optimal power allocation depends on a large number of factors, including the power-to-frequency relationship of each processor, the arrival rate of incoming jobs, the minimum and maximum power consumption levels, whether the system has an open-loop configuration or a closed-loop configuration, etc. FIG. 4 illustrates an exemplary queuing theoretic model 400 that accounts for these factors and can be used as queuing model 144 of FIG. 1. As seen by comparing FIGS. 1 and 4, queuing model 400 of FIG. 4 parallels server farm 100 of FIG. 1 for ease of understanding. Referring now to FIG. 4, and also to FIG. 1, in model 400 incoming jobs 116 are represented by arrow 404 and are indicated as having an arrival rate, λ. Router 128 allocates portions $q_1$ through $q_k$ (which correspond to portions 132(1) through 132(k) in FIG. 1) of the workload of incoming jobs 116 to each of the corresponding servers 104(1)-(k), each of which has a corresponding power consumption $P_1$ through $P_k$ and a corresponding speed $s_1$ through $s_k$. In the present example, model 400 assumes a fixed power budget, P, such that the sum of the individual power consumptions $P_1$ through $P_k$ is equal to the fixed power budget.

In this example, queuing model 400 also assumes that the jobs at each server 104(1)-(k) are scheduled using the processor sharing (PS) scheduling discipline, which is indicated at elements 408(1) through 408(k). Under PS, when there are n jobs at a server 104(1)-(k), they each receive 1/nth of that processing block's capacity. PS is identical to round-robin with quantums (as in Linux), when the quantum size approaches zero. A job's response time, T, is the time from when the job arrives until it has completed service, including waiting time. As mentioned above, a goal of power allocation optimization algorithm 132 is to minimize the mean response time, E[T].

As mentioned above, one of the factors useful for optimally allocating a fixed power budget to multiple processing blocks is the power-to-frequency relationship of the processing blocks at issue. The power-to-frequency relationship differs among the DVS, DVFS, and DVFS+DFS mechanism and also differs based on the workload of the processing block(s). Unfortunately, the functional form of the power-to-frequency relationship is not well studied in literature. However, the present inventors studied this relationship for the three scaling mechanisms using servers that support all three mechanisms. Following is an overview of results of this study, which assumed a homogeneous server farm, i.e., a server farm made up of processing blocks having the same power, frequency, and scaling characteristics.

Tools were used to limit the maximum power allocated to each server. Limiting the maximum power allocated to a server is usually referred to as "capping" the power allocated to the server. LINPACK jobs were run back-to-back to ensure that a server is always occupied by the workload and that the server is running at the specified power cap value. Hence, the power values observed were the peak power values for the specified workload. In the servers used for the study, the processing blocks had certain discrete performance points (in terms of frequency) at which the server is in a processing state. At each of these performance points, the server consumes a certain amount of power for a given workload. By quickly dithering between available performance states, it can be ensured that the server never consumes more than the set power cap value. In this way, the best performance can be obtained from a server for the given power cap value. Note that as used in this section, the term "power" refers to the system-level power, which includes the power consumed by the processing block and all other components within the server.

Figure 5A:
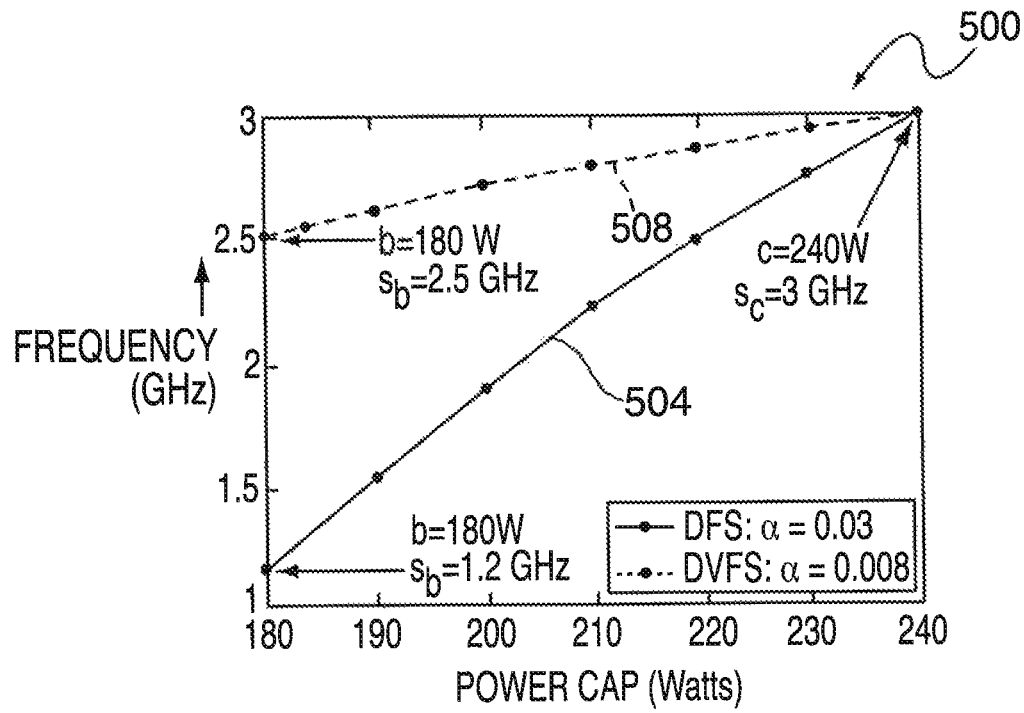
FIG. 5A is a graph illustrating power-to-frequency curves for DFS and DVFS of a server under a LINPACK workload.

FIG. 5A is a graph 500 showing power-to-frequency curves 504, 508 obtained for a LINPACK workload using, respectively, DFS and DVFS. From graph 500 it is seen that the power-to-frequency relationship for both DFS (curve 504) and DVFS (curve 508) is nearly linear. It may seem surprising that the power-to-frequency relationship for DVFS looks like a linear plot, since this is opposite to what is suggested in literature for the power-to-frequency relationship of a processor, which is cubic in nature. The reason why the power-to-frequency relationship of a server is linear can be explained by two interrelated factors. First, manufacturers usually settle on a limited number of allowed voltage levels (or performance states), which requests in a less-than-ideal relationship between power and frequency in practice. Second, DVFS is not applied on may components at the system level. For example, power consumption in memory remains proportional to the number of references to memory per unit time, which is only linearly related to the frequency of the processor. Thus, the power-to-frequency curve for both DFS and DVFS can be approximated as a linear function.

When allocating power to a server, there is a minimum level of power consumption, b, needed to operate the processor at the lowest allowable frequency (also noted as PowMin above) and a maximum level of power consumption, c, needed to operate the processor at the highest allowable frequency (also noted as PowMax above). It is recognized, however, that the specific values of b and c depend on the application that the server is running. With these power consumption levels, the following terms are formally defined for use herein:

Baseline power: b (Watts)—the minimum power consumed by a fully utilized server over the allowable range of processor frequency;

Speed at baseline power: $s_b$ (Hertz)—the speed (or frequency) of a fully utilized server running at b Watts;

Maximum power: c (Watts)—the maximum power consumed by a fully utilized server over the allowable range of processor frequency; and Speed at maximum power: $s_c$ (Hertz)—the speed (or frequency) of a fully utilized server running at c Watts.

Using this terminology, the server speed (or frequency) s (GHz) is approximated as a function of the power P (Watts) allocated to it as:

$$s = s_b + \alpha(P-b) \qquad \text{Eq. \{1\}}$$

wherein the coefficient α (units of GHz/W) is the slope of the power-to-frequency curve, for example, either curve 504 or curve 508 depending on the type of scaling mechanism used. In the subject study it was found that α=0.008 GHz/W for DVFS and α=0.03 GHz/W for DFS. Also, it was found that for the particular server used in the study, b=180 W and c=240 W for both DVFS and DFS. However, it was found that $s_b$=2.5 GHz for DVFS and $s_b$=1.2 GHz for DFS. The maximum speed in both cases was 3 GHz, which is simply the maximum speed of the processor used. It is noted that the specific values of these parameters changed depending on the workload in use. Results for other workloads are described below.

Figure 5B:
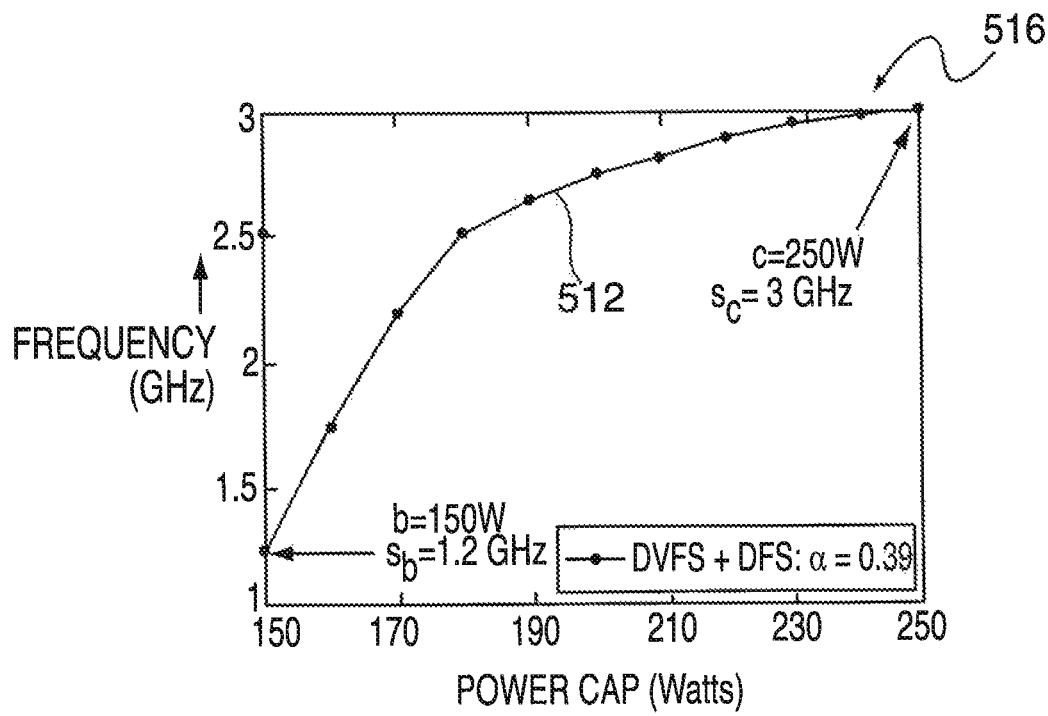
FIG. 5B is a graph illustrating a power-to-frequency curve for DVFS+DFS of a server under a LINPACK workload.

For DVFS+DFS it was expected that the power-to-frequency relationship would be piecewise since it should be a combination of DVFS and DFS. From the study, it was indeed found, as illustrated by curve 512 in graph 516 of FIG. 5B, that the relationship is piecewise linear (from 3 GHz to 2.5 GHz and then from 2.5 GHz to 1.2 GHz). Though a piecewise linear fit could certainly be used for DVFS+DFS curve 512, it was decided to approximate it using a cubic curve fit for the following reasons:

1. Using a cubic fit demonstrates how the exemplary power allocation optimization algorithms can be extended to nonlinear power-to-frequency relationships.
2. As mentioned, several papers consider the power-to-frequency relationship to be cubic, especially for a processor. By using a cubic model for DVFS+DFS, the optimal power allocation policy for those settings can be readily analyzed.

Approximating DVFS and DFS using a cubic fit yields the following relationship between the speed of a server and the power allocated to it:

$$s = s_b + \alpha' \sqrt[3]{\sqrt{P-b}}$$ Eq. {2}

Specifically, the study showed that for DVFS+DFS, $\alpha'$=0.39 GHz/$\sqrt[3]{\sqrt{W}}$ and that b=150 W, c=250 W, $s_b$=1.2 GHz, and $s_c$=3 GHz.

Exemplary Power Budget Allocation Algorithms

Following are a number of theorems derived from queuing theoretic model 400 of FIG. 4 that essentially contain corresponding respective power budget allocation algorithms. These algorithms can be implemented in a power budget allocation method, such as method 200 of FIG. 2. In the context of FIG. 1, any one or more of these algorithms can be implemented as algorithm 140 executed by router 128. It is noted that the theorems are not presented as algorithms per se, but those skilled in the art can easily implement these theorems as executable digital algorithms using basic techniques well known in the art.

Theorems are presented herein for both open loop and closed loop system configurations for each of DFS, DVFS, and DVFS+DFS. An "open loop configuration" of a multi-processor system is one in which jobs arrive from outside the system and leave the system after the system has completed them. The relevant theorems assume that the arrival process of the incoming jobs is Poisson, with an average rate $\lambda$ jobs/sec. It is noted that sometimes it is more convenient to instead express $\lambda$ in units of GHz. This conversion is easily achieved since an average job has size E[S] gigacycles. In the theorems presented in this section, $\lambda$ is in the units of GHz. However, in the queuing analysis it is convenient to switch to jobs/sec. Likewise, while it is common to express the speed of the processor s in GHz, it can also be convenient to switch to jobs/sec. Indeed, the units of jobs/sec for both the processor speed and $\lambda$ are used in the Appendix of U.S. Provisional Patent Application Ser. No. 61/341,922, filed on Apr. 7, 2010, and titled "Optimal Power Allocation In Server Farms" that provides proofs for the specific theorems disclosed below. That Appendix is incorporated by reference herein for those proofs. A "closed loop configuration" of a multi-processor system is one in which there are always a fixed number of users N (also referred to as the "multi-programming level") that each submit one job to a server. Once a user's job is completed, that user immediately creates another job, keeping the number of jobs constant at N.

In all of the theorems that follow, the optimal power allocation ($P_1^*, \ldots P_2^*, \ldots, P_k^*$) for a k-server farm that minimizes the mean response time E[T] given a fixed peak power budget $P = \sum_{i=1}^{k} P_i^*$. While deriving the optimal power allocation is non-trivial, as those skilled in the art will readily appreciate, computing E[T] for a given allocation is simple. The reader is referred to the Appendix of the '922 patent application mentioned above. As noted above, each fully utilized server has a minimum power consumption of b Watts and a maximum power consumption of c Watts. To illustrate the results clearly, it is assumed in this section (and in the above-mentioned Appendix) that the power budget P is such that the PowMax allocation runs n servers each at power c and the PowMin allocation runs m servers each at a power b. This is equivalent to saying:

$$P = m \times b = n \times c$$ Eq. {3} wherein m and n are each less than or equal to k, and m≥n. The PowMed allocation runs each of l servers at a power of P/l, wherein l is specific to the particular theorem at issue. For examples of how/is determined, see Theorems 2 and 5 (Algorithms {2} and {5}), below.

Theorems (Algorithms) for Open Loop Configurations

Theorem 1 derives the optimal power allocation in an open loop configuration for a linear power-to-frequency relationship, as is the case for DFS and DVFS for the conditions noted above. In these cases, each server frequency varies with the power allocation to it as noted in Equation {1}, above. Theorem 1 says that if the speed at baseline, $s_b$, is sufficiently low, then the PowMax allocation is optimal. In contrast, if $s_b$ is low, then the PowMin allocation is optimal for high incoming job arrival rates and the PowMax allocation is optimal for low incoming job arrival rates. If $s_i^*$ is the speed of server i when run at power $P_i^*$, then the stability condition requires that $\lambda < \sum_{i=1}^{k} s_i^*$.

Theorem 1: Given an open loop k-server farm configuration with a linear power-to-frequency relationship (given by Eq. {1}) and power budget P, the following power allocation minimizes the mean response time E[T]:

$$\text{If } \frac{s_b}{b} \leq \alpha: P_{1,2,\ldots,n}^* = c, P_{n+1,n+2,\ldots,k}^* = 0 \quad \text{Algorithm}\{1\}$$

$$\text{If } \frac{s_b}{b} > \alpha: \begin{cases} P_{1,2,\ldots,n}^* = c, P_{n+1,n+2,\ldots,k}^* = 0 \text{ if } \lambda \leq \lambda_{low} \\ P_{1,2,\ldots,m}^* = b, P_{m+1,m+2,\ldots,k}^* = 0 \text{ if } \lambda > \lambda_{low} \end{cases}$$

where $\lambda_{low} = \alpha \cdot P$.

Corollary 1 corresponding to Theorem 1 is that for DFS, the PowMax allocation is optimal and that for DVFS, the PowMax allocation is optimal at low arrival rates and Pow-Min is optimal at high arrival rates. Section 4.2 of the '922 application describes the intuition behind Theorem 1 and its corollary. Section 4.2 is incorporated herein by reference for such description.

Theorem 2 derives the optimal power allocation for non-linear power-to-frequency relationships, such as the cubic relationship mentioned above in the case of DVFS+DFS. In such cases, the server frequency varies with the power allocated to it as indicated in Equation {2}, above. Theorem 2 says that if the incoming job arrival rate is sufficiently low, then the PowMax allocation is optimal. However, if the arrival rate is high, then the PowMed allocation is optimal. It is noted that although Theorem 2 specifies a cubic power-to-frequency relationship, similar results should hold in the general case wherein the server frequency varies as the n-th root of the power allocated to the server.

Theorem 2: Given an open loop k-server farm configuration with a cubic power-to-frequency relationship (given by Eq. {2}) and power budget P, the following power allocation minimizes the mean response time E[T]:

$$P^*_{1,2,\ldots,n} = c, \; P^*_{n+1,n+2,\ldots,k} = 0 \text{ if } \lambda \leq \lambda'_{low}.$$   Algorithm {2}

$$P^*_{1,2,\ldots,l} = \frac{P}{l}, \; P^*_{l+1,l+2,\ldots,k} = 0 \text{ if } \lambda > \lambda'_{low}$$

where $\lambda'_{low} = \frac{nl\alpha'}{l-n}\left(\sqrt[3]{c-b} - \sqrt[3]{\frac{P}{l}-b}\right)$ and $$l = \left\lfloor \frac{P}{b+\left(\frac{\alpha' P}{3\lambda}\right)^{\frac{3}{2}}} \right\rfloor.$$

Corollary 2 corresponding to Theorem 2 is that for DVFS, the PowMax allocation is optimal at low arrival rates and the PowMed allocation is optimal for high arrival rates. Section 4.2 of the '922 application describes the intuition behind Theorem 2 and its corollary. Section 4.2 is incorporated herein by reference for such description.

Theorems (Algorithms) for Closed Loop Configurations

As mentioned above, for closed loop configurations the number of jobs in the system (e.g., server farm) is constant. Here reliance is placed on asymptotic operational laws that approximate system performance for very high N and very low N. Reference is made to the Appendix of the '922 application for further information. Theorem 3 says that for a closed server farm configuration with a sufficiently low value of N, the PowMax allocation is optimal.

Theorem 3: Give a closed loop k-server farm configuration with a linear or cubic power-to-frequency relationship (given by Eqs. {1} and {2}), the following power allocation minimizes the mean response time E[T] for low N based on the asymptotic operational approximation relied upon:

$$P_{1,2,\ldots,n}^* = c, \; P_{n+1,n+2,\ldots,k}^* = 0$$   Algorithm {3}

Corollary 3 corresponding to Theorem 3 is that for a closed-loop server farm with low N, the PowMax allocation is optimal for DFS, DVFS, and DVFS+DFS. Section 4.2 of the '922 application describes the intuition behind Theorem 3 and its corollary. Section 4.2 is incorporated herein by reference for such description.

Theorem 4 says that for high N, if the speed at baseline, $s_b$, is sufficiently low, then PowMax is optimal. In contrast, if $s_b$ is high, then PowMin is optimal.

Theorem 4: Given a closed loop k-server farm configuration with a linear power-to-frequency relationship (given by Eq. {1}), the following power allocation minimizes the mean response time E[T] for high N, based on the asymptotic operational approximation relied upon:

If $\frac{s_b}{b} < \alpha$: $P^*_{1,2,\ldots,n} = c, \; P^*_{n+1,n+2,\ldots,k} = 0$   Algorithm {4}

If $\frac{s_b}{b} \geq \alpha$: $P^*_{1,2,\ldots,m} = b, \; P^*_{m+1,m+2,\ldots,k} = 0$ Corollary 4 corresponding to Theorem 4 states that for DFS, the PowMax allocation is optimal for high N and for DVFS, the PowMin allocation is optimal for high N. Section 4.2 of the '922 application describes the intuition behind Theorem 4 and its corollary. Section 4.2 is incorporated herein by reference for such description.

Theorem 5 deals with the case of high N for a non-linear power-to-frequency relationship. Theorem 5 says that if the speed at baseline, $s_b$, is sufficiently low, then the PowMax allocation is optimal. In contrast, if $s_b$ is high, then the PowMed allocation is optimal.

Theorem 5: Given a closed loop k-server farm configuration with a cubic power-to-frequency relationship (given by Eq. {2}), the following power allocation minimizes the mean response time E[T] for high N, based on the asymptotic operational approximation relied upon:

If $s_b < s'$: $P^*_{1,2,\ldots,n} = c, \; P^*_{n+1,n+2,\ldots,k} = 0$   Algorithm {5}

If $s_b \geq s'$: $P^*_{1,2,\ldots,l} = b+x, \; P^*_{l+1,l+2,\ldots,k} = 0$ where $$l = \left\lfloor \frac{P}{b+x} \right\rfloor,$$

$s' = \frac{ms_c}{l} - \alpha'\sqrt[3]{x}$ and $x$ is the non-negative, real solution of the equation $$b = 2x + \frac{1}{\alpha'}\left(3x^{\frac{2}{3}} s_b\right).$$

Corollary 5 corresponding to Theorem 5 states that for DVFS+DFS, for high N, the PowMed allocation is optimal if $s_b$ is high, else PowMax is optimal. Section 4.2 of the '922 application describes the intuition behind Theorem 4 and its corollary. Section 4.2 is incorporated herein by reference for such description.

Again, proofs for the foregoing Theorems 1 through 5 are found in the Appendix of the '922 application. As also mentioned above, those skilled in the art will readily understand how to implement Theorems 1 through 5, including Algorithms {1} through {5}, in software, not only individually but also in any suitable combination to suit the configuration(s) of the multi-processor system at issue and the type(s) of scaling mechanism(s) available for the processors used. In addition, those skilled in the art will readily appreciate that Theorems 1 through 5 and Algorithms {1} through {5} are merely exemplary of the linear and cubic power-to-frequency relationships discussed above and that other suitable theorems and algorithms can be derived, with guidance of the present disclosure and without undue experimentation, by people of ordinary skill in the art using power-to-frequency relationships having other shapes.

Experimental Results

Experiments were conducted to test the foregoing theorems in an actual multi-processor system. The experimental setup consisted of a server farm with up to fourteen BLADECENTER® HS21 blade servers available from International Business Machines Corporation (IBM), Armonk, N.Y. All of the servers resided in a common chassis, and each server blade featured two 3.0 GHz dual-core XEON® Woodcrest processors from Intel, and 1 GB of memory. APACHE® software was installed as an application server on each of the blade servers to process transactional requests. To generate HTTP requests for the APACHE® web servers, an additional blade server on the same chassis was employed as a workload generator to reduce the effects of network latency. The workload generator used the web server performance benchmarking tool httperf in the open server farm configuration and wbox in the closed server farm configuration. The httperf and wbox tools were modified and extended to allow for multiple servers and to specify the routing probability among the servers. The power to the servers was measured and allocated using IBM's AMEster software. The AMEster software, along with additional scripts, collected all relevant data for the experiments.

In the test setup, the baseline power level and the maximum power level for both DFS and DVFS are b=180 W and c=240 W, respectively. For DVFS+DFS, b=150 W and c=250 W. In each of the experiments, it was attempted to fix the power budget P to be an integer multiple of b and c, as in Equation {3}, above. The XEON® Woodcrest processors used in the experiments support the DFS, DVFS, and DVFS+DFS mechanisms. Under DFS, each processor allows for eight operating points that correspond to effective frequencies of 12.5%, 25%, 37.5%, 50%, 62.5%, 75%, 87.5%, and 100% of its maximum frequency of 3 GHz. Under DVFS, each processor allows for four operating points that correspond to effective frequencies of 66.6%, 77.7%, 88.9%, and 100% of its maximum frequency of 3 GHz. Under DVFS+DFS, each processor allows for eleven operating points that correspond to effective frequencies of 8.3%, 16.5%, 25%, 33.3%, 41.6%, 50%, 58.3%, 66.6%, 77.7%, 88.9%, and 100% of its maximum frequency of 3 GHz.

Open Loop Server Farm Configuration with LINPACK Workload

Figure 6A:
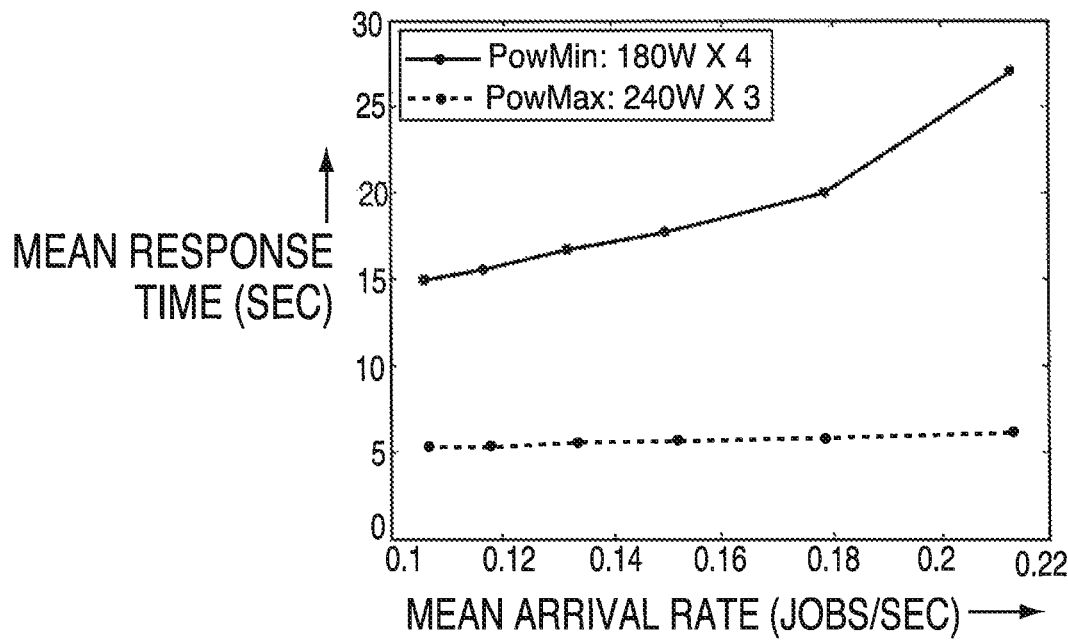
FIG. 6A is a graph illustrating experimental results for an open loop server farm configuration using DFS and a LINPACK workload.

FIG. 6A plots the mean response time as a function of the arrival rate for DFS with a power budget of P=720 W. In this case, PowMax (represented by the dashed line) denotes running 3 servers at c=240 W and turning off all other servers. PowMin (represented by the solid line) denotes running 4 servers at b=180 W and turning off all other servers. Clearly, PowMax outperforms PowMin throughout the range of arrival rates. This is in agreement with the predictions of Theorem 1. Note from FIG. 6A that the improvement in mean response time afforded by PowMax over PowMin is huge; ranging from a factor of 3 at low arrival rates (load, p≈0.2) to as much as a factor of 5 at high arrival rates (load, p≈0.7). This is because the power-to-frequency relationship for DFS is steep (See FIG. 5A), hence running servers at maximum power levels affords a huge gain in server frequency. Arrival rates higher than 0.22 jobs/sec cause the experimental systems to overload under PowMin because $s_b$ is very low for DFS. Hence, the experiments only go as high as 0.22 jobs/sec.

Figure 6B:
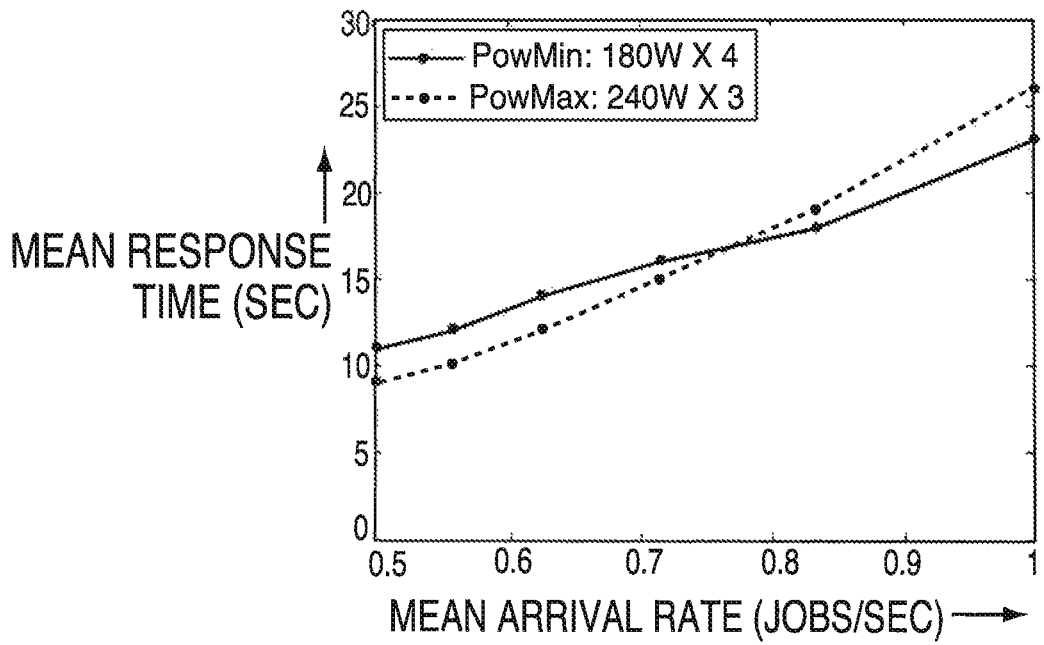
FIG. 6B is a graph illustrating experimental results for an open loop server farm configuration using DVFS and a LINPACK workload.

FIG. 6B plots the mean response time as a function of the arrival rate for DVFS with a power budget of P=720 W. PowMax (represented by the dashed line) again denotes running 3 servers at c=240 W and turning off all other servers. PowMin (represented by the solid line) denotes running 4 servers at b=180 W and turning off all other servers. It is seen that when the arrival rate is low, PowMax produces lower mean response times than PowMin. In particular, when the arrival rate is 0.5 jobs/sec, PowMax affords at 22% improvement in mean response time over PowMin. However, at higher arrival rates, PowMin outperforms PowMax, as predicted by Theorem 1. In particular, when the arrival rate is 1 job/sec, PowMin affords a 14% improvement in mean response time over PowMax. Under DVFS, the system can afford arrival rates up to 1 job/sec before overloading the system. To summarize, under DVFS, it was seen that PowMin can be preferable to PowMax. This is due to the flatness of the power-to-frequency curve for DVFS (See FIG. 5A), and agrees perfectly with Theorem 1.

Figure 7:
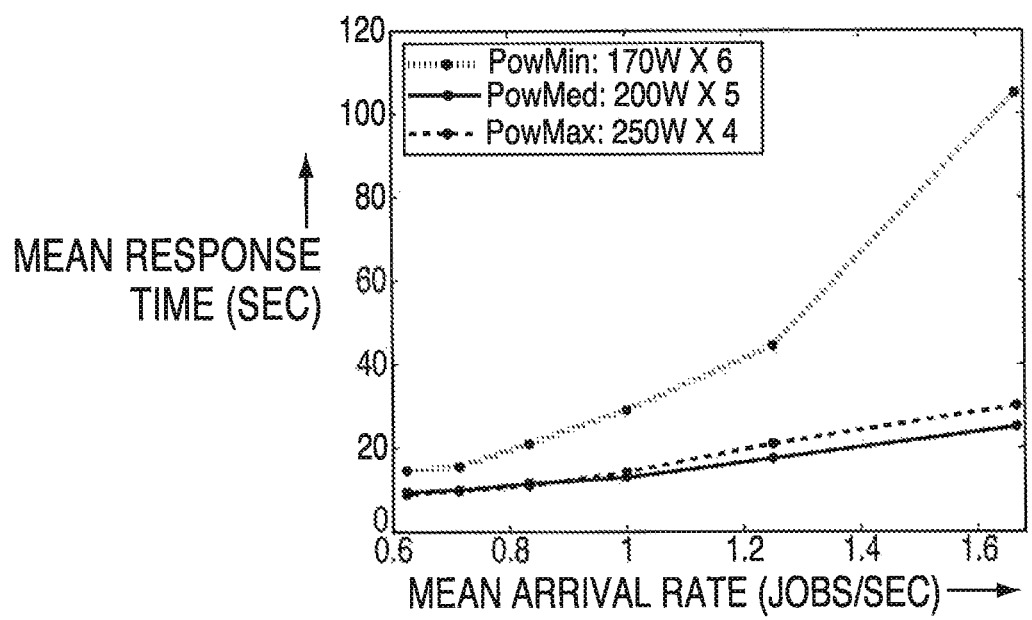
FIG. 7 is a graph illustrating experimental results for an open loop server farm configuration using DVFS+DFS and a LINPACK workload.

FIG. 7 plots the mean response time as a function of the arrival rate for DVFS+DFS with a power budget of P=1000 W. In this case, PowMax (represented by the dashed line) denotes running 4 servers at c=250 W and turning off all other servers. PowMed (represented by the solid line) denotes running 5 servers at $$\frac{b+c}{2} = 200 \text{ W}$$

and turning off all other servers. It was seen that when the arrival rate is low, PowMax produces lower mean response times than PowMed. However, at higher arrival rates, PowMed outperforms PowMax, exactly as predicted by Theorem 2. For the sake of completion, also plotted is PowMin (dotted line in FIG. 7). Note that PowMin is worse than both PowMed and PowMax throughout the range of arrival rates. Note that the value of $$\frac{b+c}{2} = 200 \text{ W}$$

was used as the optimal power allocated to each server in PowMed for the experiments as this value is close to the theoretical optimum predicted by Theorem 2 (which is around 192 W for the range of arrival rates used) and also helps to keep the power budget at 1000 W.

Closed Loop Server Farm Configuration with LINPACK Workload

Figure 8A:
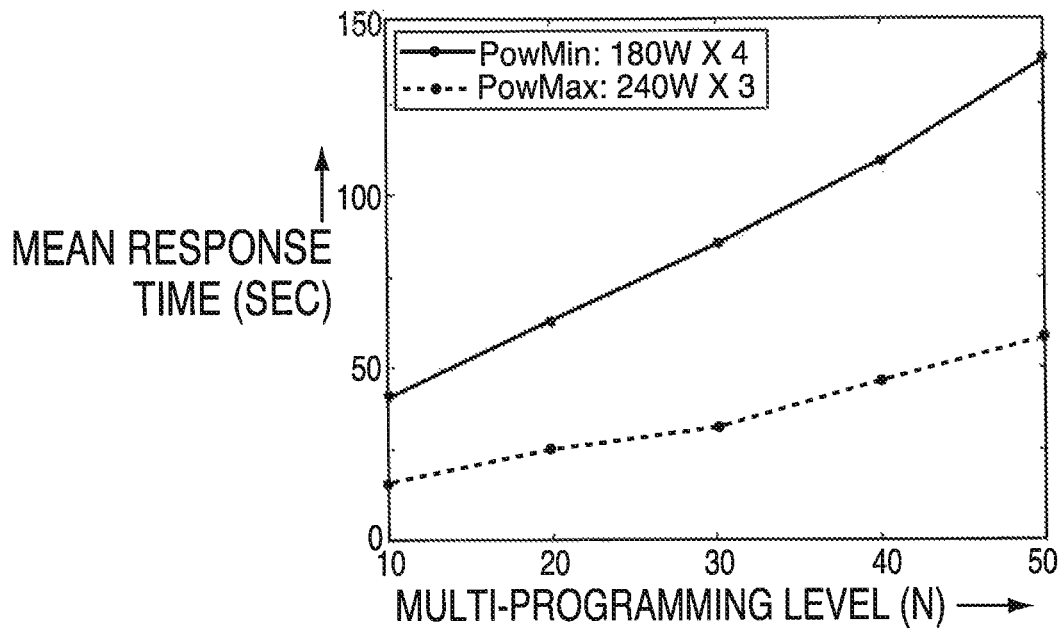
FIG. 8A is a graph illustrating experimental results for a closed loop server farm configuration using DFS and a LINPACK workload.

Turning to the experimental results for closed server farm configurations. FIG. 8A plots the mean response time as a function of the multi-programming level (MPL=N) for DFS with a power budget of P=720 W. In this case, PowMax (represented by the dashed line) denotes running 3 servers at c=240 W and turning off all other servers. PowMin (represented by the solid line) denotes running 4 servers at b=180 W and turning off all other servers. Clearly, PowMax outperforms PowMin throughout the range of N, by almost a factor of 2 throughout the range. This is in agreement with the predictions of Theorem 3.

Figure 8B:
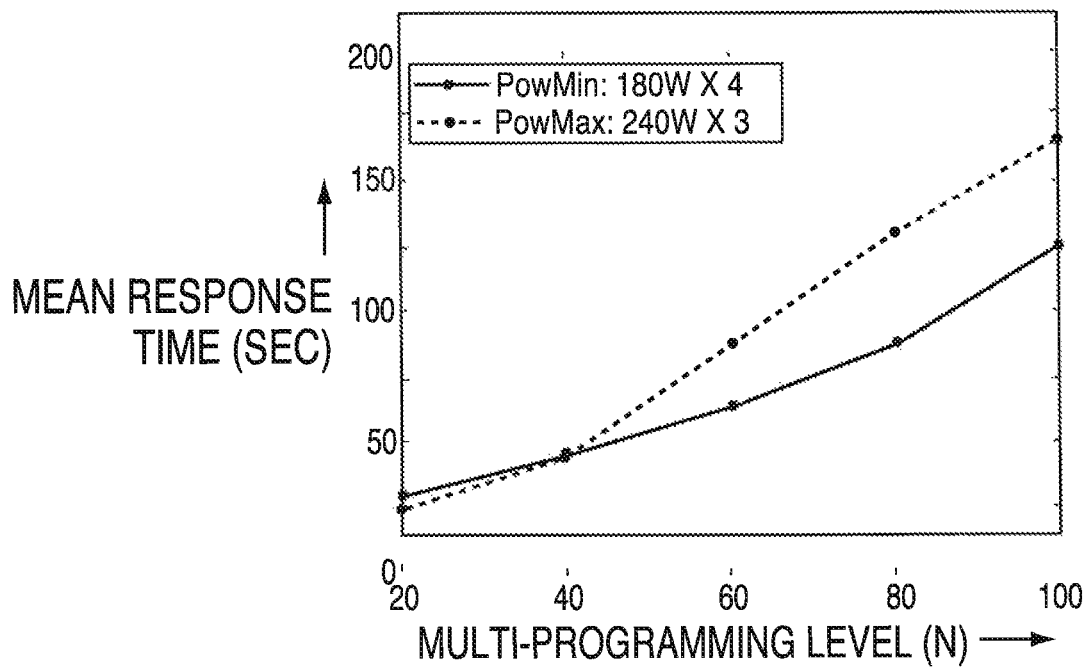
FIG. 8B is a graph illustrating experimental results for a closed loop server farm configuration using DVFS and a LINPACK workload.

FIG. 8B plots the mean response time as a function of the multi-programming level for DVFS with a power budget of P=720 W. PowMax (represented by the dashed line) again denotes running 3 servers at c=240 W and turning off all other servers. PowMin (represented by the solid line) denotes running 4 servers at b=180 W and turning off all other servers. It is seen that when N is high, PowMin produces lower mean response times than PowMax. This is in agreement with the predictions of Theorem 4. In particular, when N=100, PowMin affords a 30% improvement in mean response time over PowMax. However, when N is low, PowMax produces slightly lower response times than PowMin. This is in agreement with Theorem 3.

Figure 9:
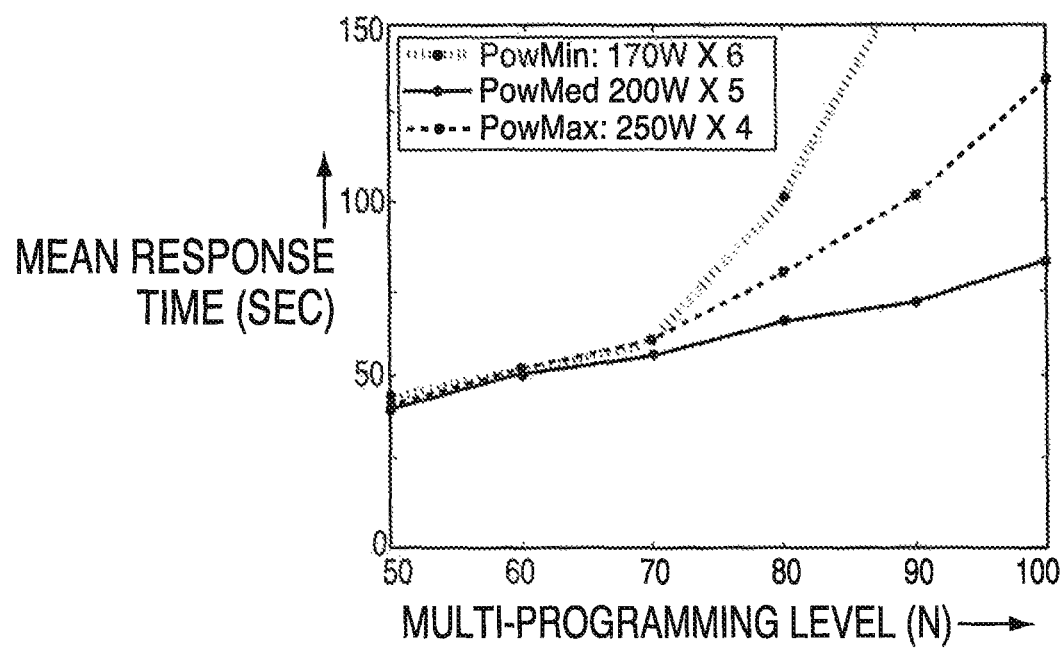
FIG. 9 is a graph illustrating experimental results for a closed loop server farm configuration using DVFS+DFS and a LINPACK workload.

FIG. 9 plots the mean response time as a function of the multi-programming level for DVFS+DFS with a power budget of P=1000 W. In this case, PowMax (represented by the dashed line) denotes running 4 servers at c=250 W and turning off all other servers. PowMed (represented by the solid line) denotes running 5 servers at $$\frac{b+c}{2} = 200 \text{ W}$$

and turning off all other servers. PowMin (represented by the dotted line) denotes running 6 servers at 170 W. It is seen that when N is high, PowMed produces lower mean response times than PowMax. This is in agreement with the predictions of Theorem 5. In particular, when N=100, PowMed affords a 40% improvement in mean response time over PowMax. However, when N is low, PowMed produces only slightly lower response times than PowMax. Note that throughout the range of N, PowMin is outperformed by both PowMax and PowMed.

Alternative Workloads

Thus far the experimental results have been for a CPU bound workload LINPACK. This section presents experimental results for some other workloads. These experimental results agree with our theoretical predictions even in the case of non-CPU bound workloads.

DAXPY

DAXPY is a CPU bound workload which has been sized to be L1 cache resident. This means DAXPY uses a lot of processor and L1 cache but rarely uses the server memory and disk subsystems. Hence, the power-to-frequency relationship for DAXPY is similar to that of CPU bound LINPACK except that DAXPY's peak power consumption tends to be lower than that of LINPACK, since DAXPY does not use a lot of memory or disk.

Figure 10A:
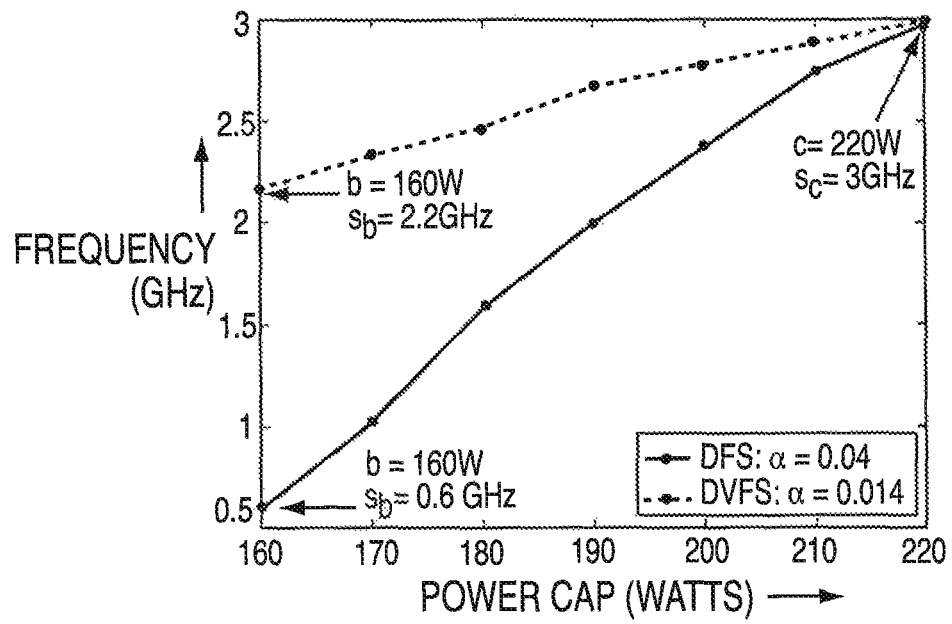
FIG. 10A is a graph illustrating power-to-frequency curves for DFS and DVFS of a server under a processor-bound DAXPY workload.
Figure 10B:
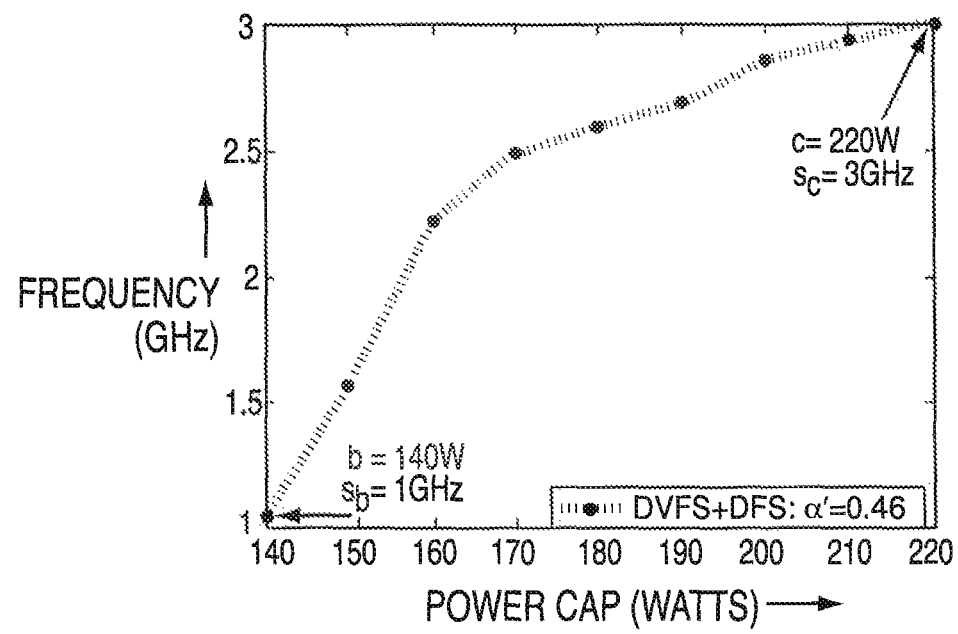
FIG. 10B is a graph illustrating a power-to-frequency curve for DVFS+DFS of a server under a processor-bound DAXPY workload.

FIGS. 10A and 10B present results for the power-to-frequency relationship for DAXPY. The functional form of the power-to-frequency relationship under DFS and DVFS in FIG. 10A is clearly linear. However, the power-to-frequency relationship under DVFS+DFS in FIG. 10B is better approximated by a cubic relationship. These trends are similar to the power-to-frequency relationship for LINPACK seen in FIG. 5.

Figure 11A:
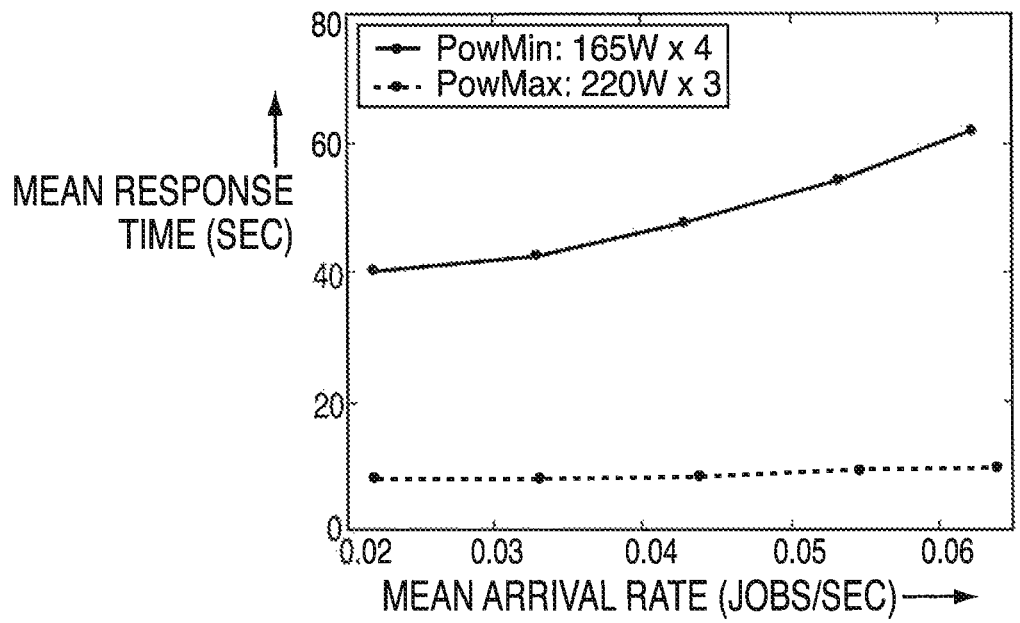
FIG. 11A is a graph illustrating experimental results for an open loop server farm configuration using DFS and a processor-bound DAXPY workload.
Figure 11B:
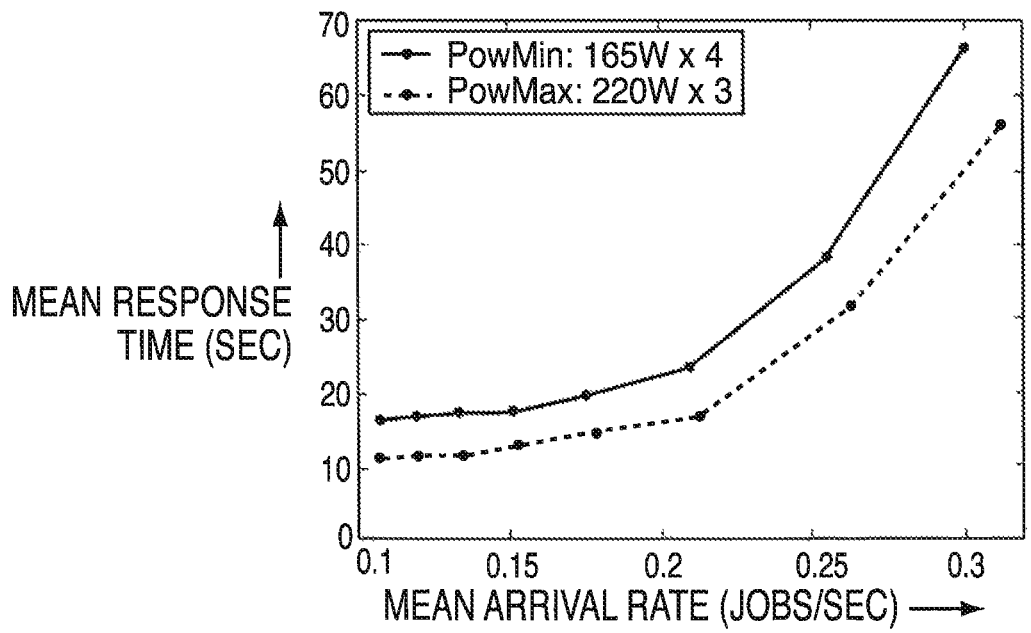
FIG. 11B is a graph illustrating experimental results for an open loop server farm configuration using DVFS and a processor-bound DAXPY workload.
Figure 11C:
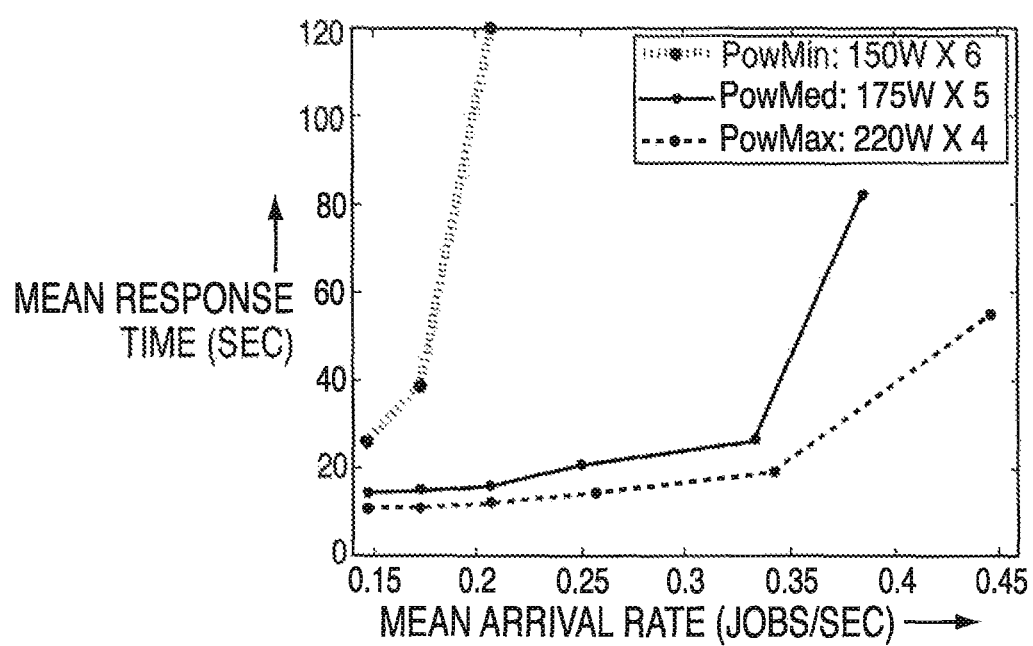
FIG. 11C is a graph illustrating experimental results for an open loop server farm configuration using DVFS+DFS and a processor-bound DAXPY workload.

FIGS. 11A, 11B and 11C present power allocation results for DAXPY under DFS, DVFS, and DVFS+DFS respectively. For DFS, in FIG. 11A, PowMax outperforms PowMin throughout the range of arrival rates, by as much as a factor of 5. This is in agreement with Theorem 1. Note that 165 W was used as the power allocated to each server under PowMin to keep the power budget same for PowMin and PowMax. For DVFS, in FIG. 11B, PowMax outperforms PowMin throughout the range of arrival rates, by around 30%. This is in contrast to LINPACK, where PowMin outperforms PowMax at high arrival rates. The reason why PowMax outperforms PowMin for DAXPY is the lower value of $s_b$=2.2 GHz for DAXPY as compared to $s_b$=2.5 GHz for LINPACK. Since $$\frac{s_b}{b} = 0.0137 < \alpha = 0.014$$

for DAXPY under DVFS, Theorem 1 rightly predicts PowMax to be optimal. Finally, in FIG. 11C for DVFS+DFS, PowMax outperforms both PowMed and PowMin throughout the range of arrival rates. Again, this is in contrast to LINPACK, where PowMed outperforms PowMax at high arrival rates. The reason why PowMax outperforms PowMed for DAXPY is the higher value of $\alpha'$=0.46 GHz/$\sqrt{W}$ for DAXPY as compared to $\alpha'$=0.39 GHz/$\sqrt[3]{W}$ for LINPACK. This is in agreement with the predictions of Theorem 2 for high values of $\alpha'$. Intuitively, for a cubic power-to-frequency relationship, we have from Eq. (2): $s=s_b+\alpha' \sqrt[3]{\sqrt{P-b}}$. As $\alpha'$ increases, we get more server frequency for every Watt of power added to the server. Thus, at high $\alpha'$, as much power as possible is allocated to every server, implying PowMax.

STREAM

STREAM is a memory bound workload which does not use a lot of processor cycles. Hence, the power consumption at a given server frequency for STREAM is usually lower than CPU bound LINPACK and DAXPY.

Figure 12A:
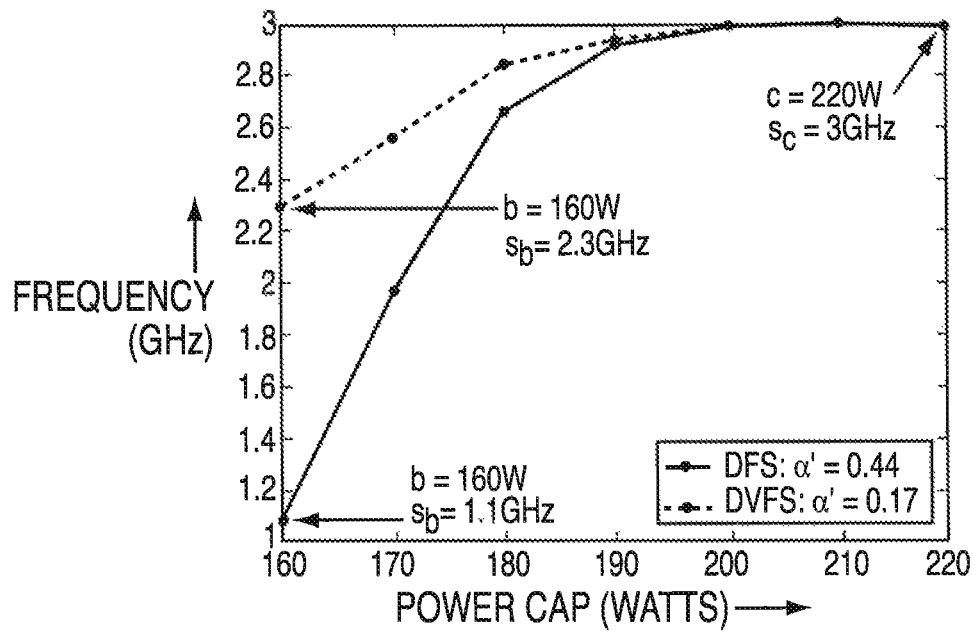
FIG. 12A is a graph illustrating power-to-frequency curves for DFS and DVFS of a server under a memory-bound STREAM workload.
Figure 12B:
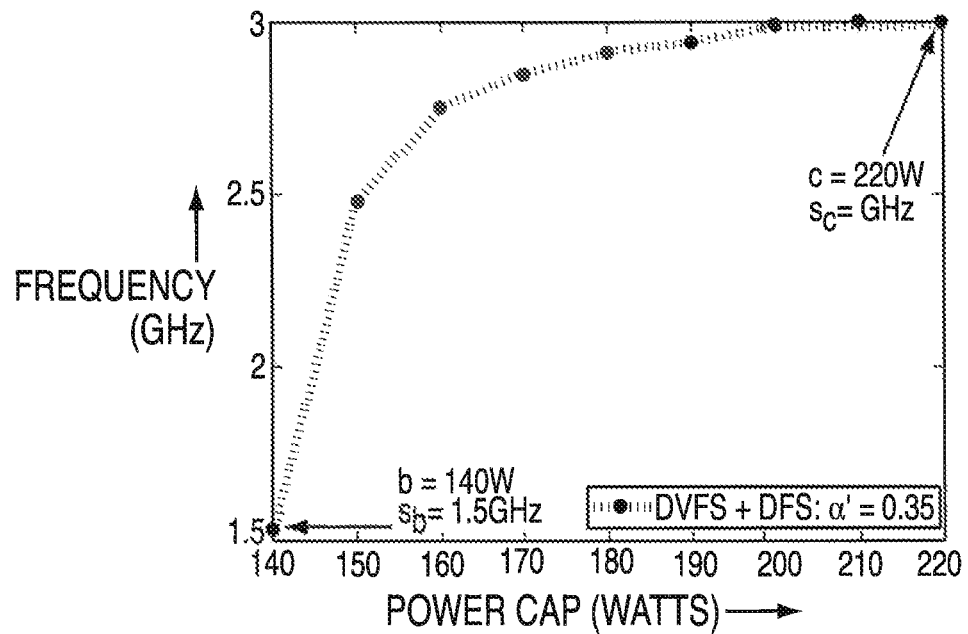
FIG. 12B is a graph illustrating a power-to-frequency curve for DVFS+DFS of a server under a memory-bound STREAM workload.

FIGS. 12A and 12B present results for the power-to-frequency relationship for STREAM. Surprisingly, the functional form of the power-to-frequency relationship under DFS, DVFS, and DVFS+DFS is closer to a cubic relationship than to a linear one. In particular, the gain in server frequency per Watt at higher power allocations is much lower than the gain in frequency per Watt at lower power allocations. It appears that this observation can be supported as follows: At extremely low server frequencies, the bottleneck for STREAM's performance is the CPU. Thus, every extra Watt of power added to the system would be used up by the CPU to improve its frequency. However, at higher server frequencies, the bottleneck for STREAM's performance is the memory subsystem since STREAM is memory bound. Thus, every extra Watt of power added to the system would mainly be used up by the memory subsystem and the improvement in processor frequency would be minimal.

Figure 13A:
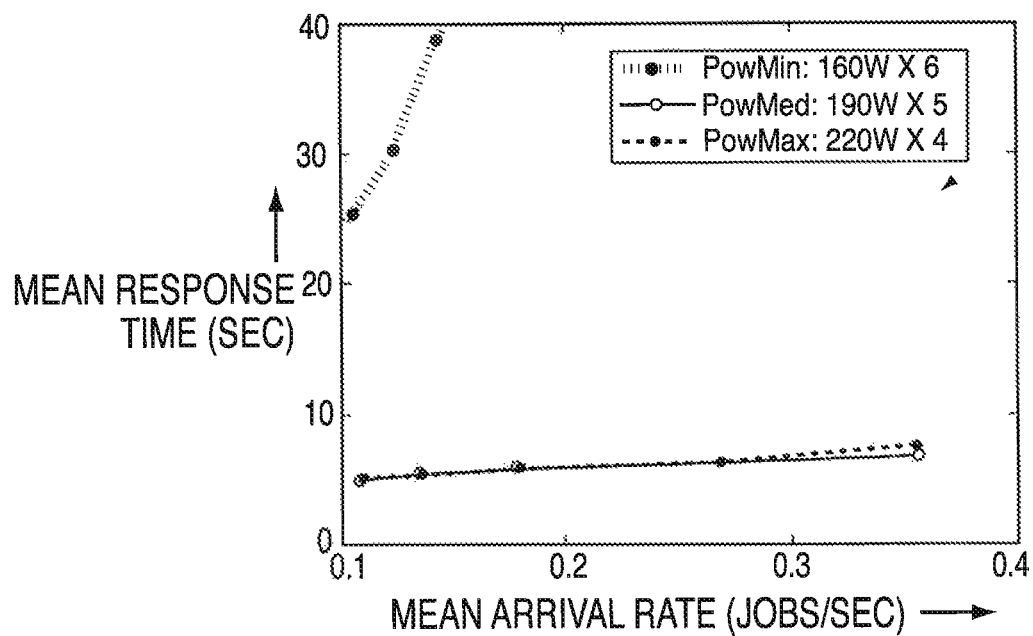
FIG. 13A is a graph illustrating experimental results for an open loop server farm configuration using DFS and a memory-bound STREAM workload.
Figure 13B:
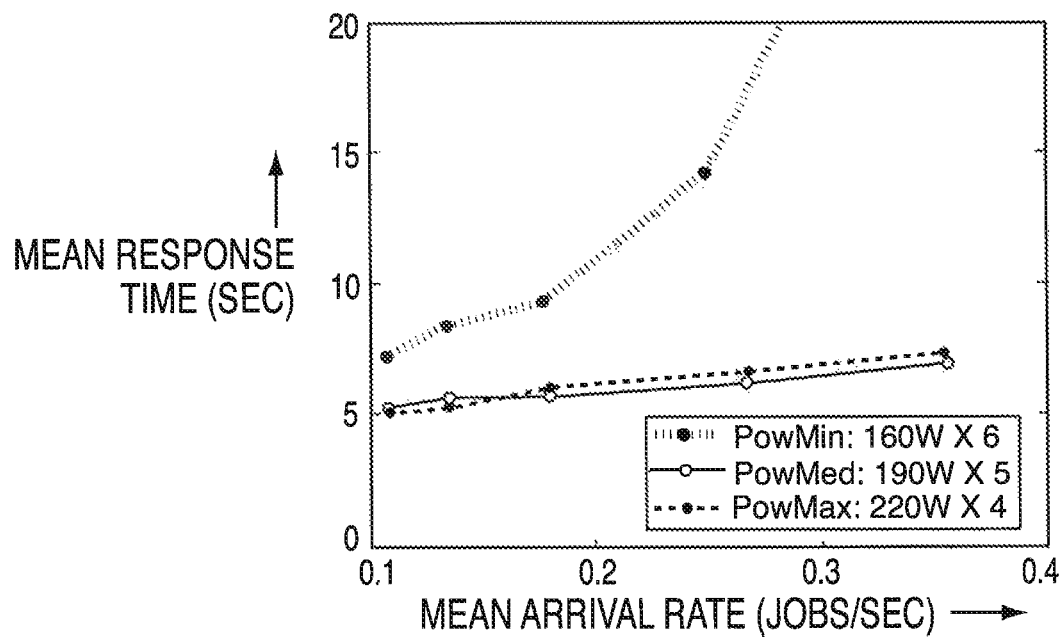
FIG. 13B is a graph illustrating experimental results for an open loop server farm configuration using DVFS and a memory-bound STREAM workload.
Figure 13C:
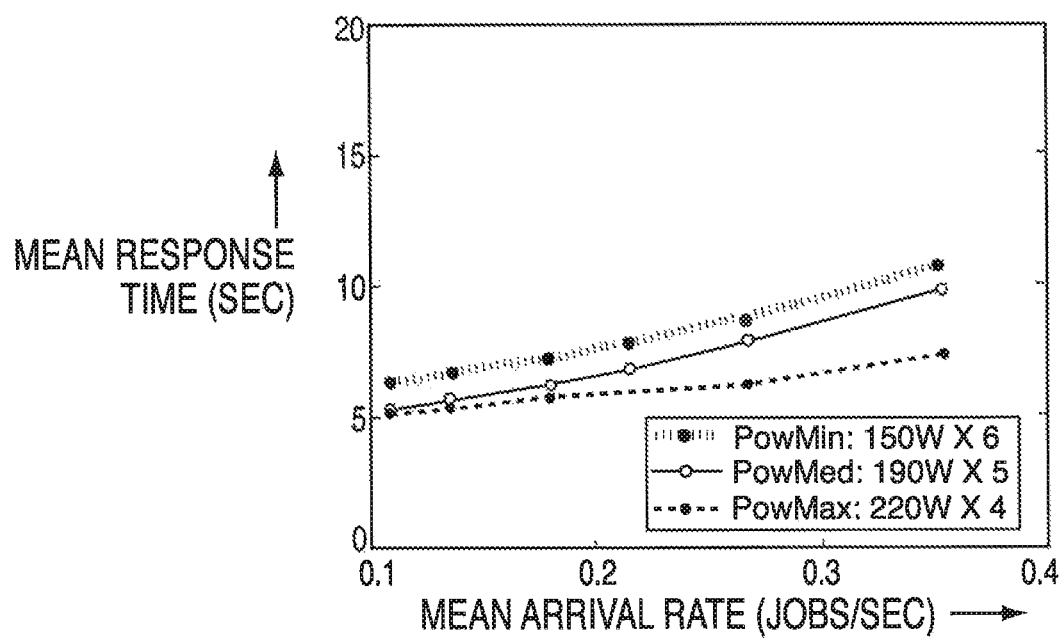
FIG. 13C is a graph illustrating experimental results for an open loop server farm configuration using DVFS+DFS and a memory-bound STREAM workload.

FIGS. 13A, 13B and 13C present power allocation results for STREAM under DFS, DVFS, and DVFS+DFS respectively. Due to the downwards concave nature of the power-to-frequency curves for STREAM studied in FIG. 12, Theorem 2 says that PowMax should be optimal at low arrival rates and PowMed should be optimal at high arrival rates. However, for the values of $\alpha'$ in FIG. 12, it was found that the threshold point $\lambda_{low}$, below which PowMax is optimal, is quite high. Hence, PowMax is optimal in FIG. 13C. In FIGS. 13A and 13B, PowMax and PowMed produce similar response times.

GZIP and BZIP2

GZIP and BZIP2 are common software applications used for data compression in Unix systems. These CPU bound compression applications use sophisticated algorithms to reduce the size of a given file. GZIP and BZIP2 were used to compress a file of uncompressed size 150 MB. For GZIP, it was found that PowMax is optimal for all of DFS, DVFS, and DVFS+DFS. These results are similar to the results for DAXPY. For BZIP2, the results are similar to those of LINPACK. In particular, at low arrival rates, PowMax is optimal. For high arrival rates, PowMax is optimal for DFS, PowMin is optimal for DVFS and PowMed is optimal for DVFS+DFS.

WebBench

WebBench is a benchmark program used to measure web server performance by sending multiple file requests to a server. For WebBench, it was found the power-to-frequency relationship for DFS, DVFS, and DVFS+DFS to be cubic. This is similar to the power-to-frequency relationships observed for STREAM since WebBench is more memory and disk intensive. As theory predicts (See Theorem 2), PowMax was found to be optimal at low arrival rates and PowMed to be optimal at high arrival rates for DFS, DVFS, and DVFS+DFS.

Exemplary Computer System

Figure 14:
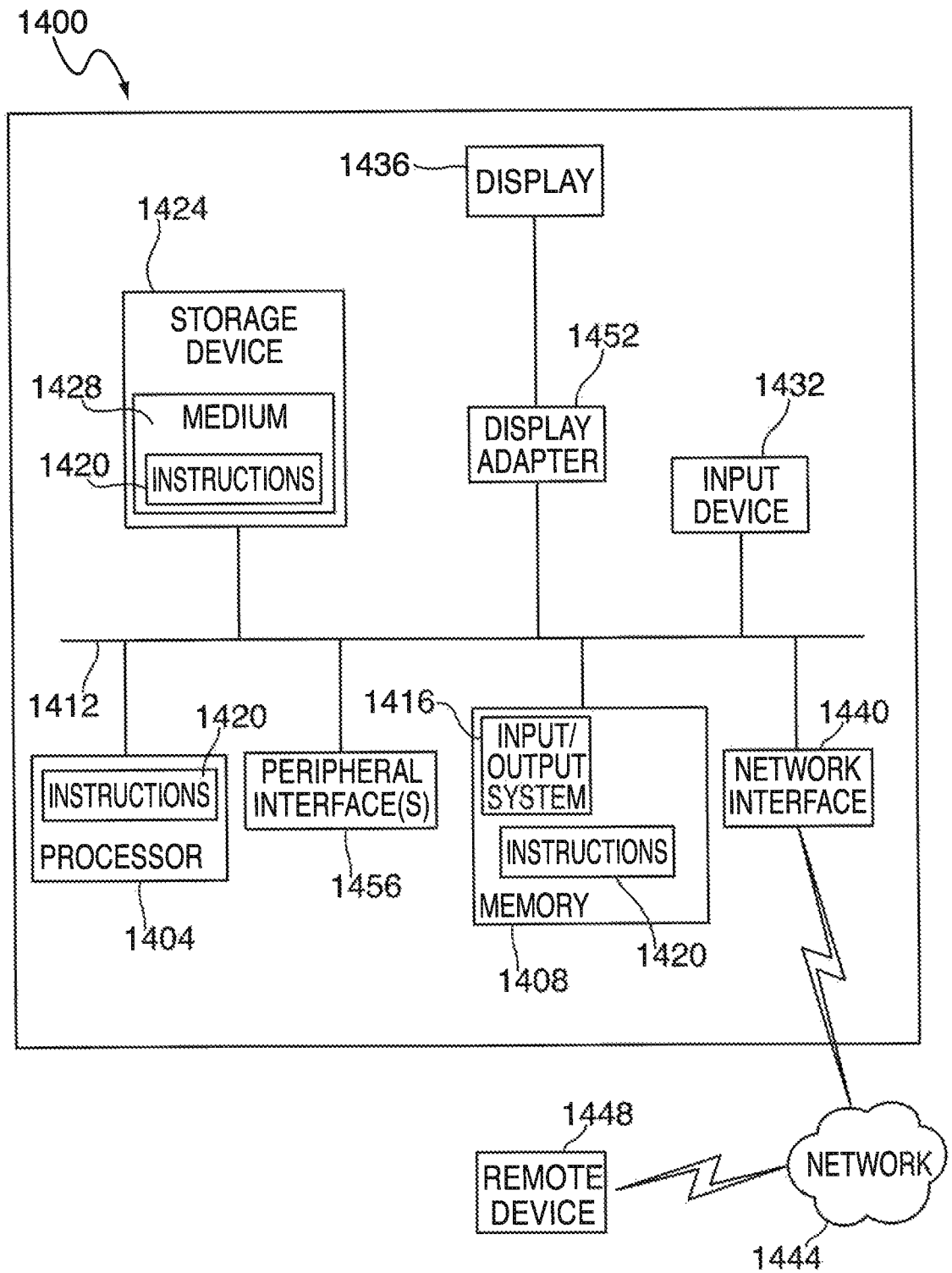
FIG. 14 is a high-level diagram of an exemplary software-driven machine capable of implementing systems and methods of the present invention.

FIG. 14 shows a diagrammatic representation of one embodiment of a computer in the exemplary form of a computer system 1400 within which a set of instructions for causing implementing a power budget allocation optimization method, such as method 200 of FIG. 2, to perform any one or more of the aspects and/or methodologies of the present disclosure. As an example, computer system 1400 can be used as router 128 for server farm 100 of FIG. 1. It is contemplated that multiple computing devices may be utilized to implement a specially configured set of instructions for causing the device to perform any one or more of the aspects and/or methodologies of the present disclosure. Computer system 1400 includes a processor 1404 and a memory 1408 that communicate with each other, and with other components, via a bus 1412. Bus 1412 may include any of several types of bus structures including, but not limited to, a memory bus, a memory controller, a peripheral bus, a local bus, and any combinations thereof, using any of a variety of bus architectures.

Memory 1408 may include various components (e.g., machine readable media) including, but not limited to, a random access memory component (e.g, a static RAM "SRAM", a dynamic RAM "DRAM", etc.), a read only component, and any combinations thereof. In one example, a basic input/output system 1416 (BIOS), including basic routines that help to transfer information between elements within computer system 1400, such as during start-up, may be stored in memory 1408. Memory 1408 may also include (e.g., stored on one or more machine-readable media) instructions (e.g., software) 1420 embodying any one or more of the aspects and/or methodologies of the present disclosure. In another example, memory 1408 may further include any number of program modules including, but not limited to, an operating system, one or more application programs, other program modules, program data, and any combinations thereof.

Computer system 1400 may also include a storage device 1424. Examples of a storage device (e.g., storage device 1424) include, but are not limited to, a hard disk drive for reading from and/or writing to a hard disk, a magnetic disk drive for reading from and/or writing to a removable magnetic disk, an optical disk drive for reading from and/or writing to an optical medium (e.g., a CD, a DVD, etc.), a solid-state memory device, and any combinations thereof. Storage device 1424 may be connected to bus 1412 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1424 (or one or more components thereof) may be removably interfaced with computer system 1400 (e.g., via an external port connector (not shown)). Particularly, storage device 1424 and an associated machine-readable storage medium 1428 may provide nonvolatile and/or volatile storage of machine-readable instructions, data structures, program modules, and/or other data for computer system 1400. In one example, software 1420 may reside, completely or partially, within machine-readable storage medium 1428. In another example, software 1420 may reside, completely or partially, within processor 1404. It is noted that the term "machine-readable storage medium" does not include signals present on one or more carrier waves.

Computer system 1400 may also include an input device 1432. In one example, a user of computer system 1400 may enter commands and/or other information into computer system 1400 via input device 1432. Examples of an input device 1432 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touchscreen, and any combinations thereof. Input device 1432 may be interfaced to bus 1412 via any of a variety of interfaces (not shown) including, but not limited to, a serial interface, a parallel interface, a game port, a USB interface, a FIREWIRE interface, a direct interface to bus 1412, and any combinations thereof. Input device 1432 may include a touch screen interface that may be a part of or separate from display 1436, discussed further below. Input device 1432 may be utilized as a user selection device for selecting one or more graphical representations in a graphical interface as described above.

A user may also input commands and/or other information to computer system 1400 via storage device 1424 (e.g., a removable disk drive, a flash drive, etc.) and/or network interface device 1440. A network interface device, such as network interface device 1440 may be utilized for connecting computer system 1400 to one or more of a variety of networks, such as network 1444, and one or more remote devices 1448 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1444, may employ a wired and/or a wireless mode of communication. In general, any network topology may be used. Information (e.g., data, software 1420, etc.) may be communicated to and/or from computer system 1400 via network interface device 1440.

Computer system 1400 may further include a video display adapter 1452 for communicating a displayable image to a display device, such as display device 1436. Examples of a display device include, but are not limited to, a liquid crystal display (LCD), a cathode ray tube (CRT), a plasma display, a light emitting diode (LED) display, and any combinations thereof. Display adapter 1452 and display device 1436 may be utilized in combination with processor 1404 to provide a graphical representation of a utility resource, a location of a land parcel, and/or a location of an easement to a user. In addition to a display device, a computer system 1400 may include one or more other peripheral output devices including, but not limited to, an audio speaker, a printer, and any combinations thereof. Such peripheral output devices may be connected to bus 1412 via a peripheral interface 1456. Examples of a peripheral interface include, but are not limited to, a serial port, a USB connection, a FIREWIRE connection, a parallel connection, and any combinations thereof.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of allocating a fixed power budget P among a number k of computers arranged in a system to process incoming jobs collectively, wherein k is greater than one and each of the k computers has an operating state, the method comprising:

determining a desired power state for each of the k computers based on a queuing theoretic model that considers an arrival rate of the incoming jobs, the fixed power budget P, and the operating state of each of the k computers; and controlling the operating state of each of the k computers based on its desired power state so that a total power provided to the k computers does not exceed the fixed power budget P;

wherein the operating state can be 1) a PowMax state having a maximum power and a maximum speed and 2)

a PowMin state having a minimum power and a minimum speed, said determining including determining, as a function of a ratio of the minimum speed to the minimum power, whether to run a number n of the k computers at the PowMax state or to run a number m of the k computers at the PowMin state.

2. A method according to claim 1, wherein said determining includes determining the desired power state as a function of a power allocation vector, a workload allocation vector, and the arrival rate.

3. A method according to claim 1, wherein said determining includes determining the desired power states as a function of a linear power-frequency relationship of each of the k computers, the arrival rate to the system, and minimum and maximum power levels of each of the k computers.

4. A method according to claim 1, wherein each of the k computers has a power-frequency relationship represented by a power-frequency curve having a slope, said determining including determining the desired power state as a function of a comparison between the ratio and the slope of the power-frequency curve.

5. A method according to claim 4, wherein the incoming jobs have an arrival rate, said determining the desired power state further includes determining the desired power state as a function of the magnitude of the arrival rate.

6. A method of allocating a fixed power budget P among a number k of computers arranged in a system to process incoming jobs collectively, wherein k is greater than one and each of the k computers has an operating state, the method comprising:
   determining a desired power state for each of the k computers based on a queuing theoretic model that considers an arrival rate of the incoming jobs, the fixed power budget P, and the operating state of each of the k computers; and
   controlling the operating state of each of the k computers based on its desired power state so that a total power provided to the k computers does not exceed the fixed power budget P;
   wherein the operating state can be 1) a PowMax state having a maximum power and a maximum speed, 2) a PowMin state having a minimum power and a minimum speed, and 3) a PowMed state having a power between the minimum power and the maximum power and a speed between the minimum speed and the maximum speed, and the incoming jobs have an arrival rate, said determining includes determining, as a function of the arrival rate, whether to run a number n of the k computers at the PowMax state or to run a number l of the k computers at the PowMed state.

7. A method according to claim 6, wherein each of the k computers has a power-frequency relationship represented by a power-frequency curve, said determining including determining the desired power state as a function of the power-frequency curve.

8. A method of allocating a fixed power budget P among a number k of computers arranged in a system to process incoming jobs collectively, wherein k is greater than one and each of the k computers has an operating state, the method comprising:
   determining a desired power state for each of the k computers based on a queuing theoretic model that considers an arrival rate of the incoming jobs, the fixed power budget P, and the operating state of each of the k computers; and
   controlling the operating state of each of the k computers based on its desired power state so that a total power provided to the k computers does not exceed the fixed power budget P;
   wherein:
      when there is a fixed number N of jobs in the system, said determining includes determining the desired power/frequency state as a function of the magnitude of N; and
      the operating state can be 1) a PowMax state having a maximum power and a maximum speed and 2) a PowMin state having a minimum power and a minimum speed, said determining further including determining whether to run a number n of the k computers at the PowMax state or to run a number m of the k computers at the PowMin state as a function of a ratio of the minimum speed to the minimum power.

9. A method of allocating a fixed power budget P among a number k of computers arranged in a system to process incoming jobs collectively, wherein k is greater than one and each of the k computers has an operating state, the method comprising:
   determining a desired power state for each of the k computers based on a queuing theoretic model that considers an arrival rate of the incoming jobs, the fixed power budget P, and the operating state of each of the k computers; and
   controlling the operating state of each of the k computers based on its desired power state so that a total power provided to the k computers does not exceed the fixed power budget P;
   wherein:
      when there is a fixed number N of jobs in the system said determining includes determining the desired power/frequency state as a function of the magnitude of N, and
      the operating state can be 1) a PowMax state having a maximum power and a maximum speed, 2) a PowMin state having a minimum power and a minimum speed, and 3) a PowMed state having a power between the minimum power and the maximum power and a speed between the minimum speed and the maximum speed, and the incoming jobs have an arrival rate, said determining further including determining whether to run a number n of the k computers at the PowMax state or to run a number l of the k computers at the PowMed state as a function of the minimum speed.

10. A machine-readable storage medium containing machine-executable instructions for performing a method of allocating a fixed power budget P among a number k of computers arranged in a system to process incoming jobs collectively, wherein k is greater than one and each of the k computers has an operating state, said machine-executable instructions comprising:
   a first set of machine-executable instructions for determining a desired power state for each of the k computers based on a queuing theoretic model that considers an arrival rate of the incoming jobs, the fixed power budget P, and power provided to each of the k computers; and
   a second set of machine-executable instructions for controlling the operating state of each of the k computers based its desired power state so that a total power provided to the k computers does not exceed the fixed power budget P;
   wherein the operating state can be 1) a PowMax state having a maximum power and a maximum speed and 2) a PowMin state having a minimum power and a minimum speed, said first set of machine-executable instructions including determining, as a function of a ratio of the minimum speed to the minimum power, whether to run a number n of the k computers at the PowMax state or to run a number in of the k computers at the PowMin state.

11. A machine-readable storage medium according to claim 10, wherein said first set of machine-executable instructions includes machine-executable A instructions for determining the desired power state as a function of a power allocation vector, a workload allocation vector, and the arrival rate.

12. A machine-readable storage medium according to claim 10, wherein said first set of machine-executable instructions includes machine-executable A instructions for determining the desired power states as a function of a linear power-frequency relationship of each of the k computers, the arrival rate to the system, and minimum and maximum power levels of each of the k computers.

13. A machine-readable storage medium according to claim 10, wherein each of the k computers has a power-frequency relationship represented by a power-frequency curve having a slope, said first set of machine-executable instructions including machine-executable instructions for determining the desired power state as a function of a comparison between the ratio and the slope of the power-frequency curve.

14. A machine-readable storage medium according to claim 13, wherein the incoming jobs have an arrival rate, said first set of machine-executable instructions further including determining the desired power state as a function of the magnitude of the arrival rate.

15. A machine-readable storage medium containing machine-executable instructions for performing a method of allocating a fixed power budget P among a number k of computers arranged in a system to process incoming jobs collectively, wherein k is greater than one and each of the k computers has an operating state, said machine-executable instructions comprising:
 a first set of machine-executable instructions for determining a desired power state for each of the k computers based on a queuing theoretic model that considers an arrival rate of the incoming jobs, the fixed power budget P, and power provided to each of the k computers; and
 a second set of machine-executable instructions for controlling the operating state of each of the k computers based its desired power state so that a total power provided to the k computers does not exceed the fixed power budget P;
 wherein the operating state can be 1) a PowMax state having a maximum power and a maximum speed, 2) a PowMin state having a minimum power and a minimum speed, and 3) a PowMed state having a power between the minimum power and the maximum power and a speed between the minimum speed and the maximum speed, and the incoming jobs have an arrival rate, said first set of machine-executable instructions including machine-executable instructions for determining, as a function of the arrival rate, whether to run a number n of the k computers at the PowMax state or to run a number l of the k computers at the PowMed state.

16. A machine-readable storage medium according to claim 15, wherein each of the k computers has a power-frequency relationship represented by a power-frequency curve, said first set of machine-executable instructions including machine-executable instructions for determining the desired power state as a function of the power-frequency curve.

17. A machine-readable storage medium containing machine-executable instructions for performing a method of allocating a fixed power budget P among a number k of computers arranged in a system to process incoming jobs collectively, wherein k is greater than one and each of the k computers has an operating state, said machine-executable instructions comprising:
 a first set of machine-executable instructions for determining a desired power state for each of the k computers based on a queuing theoretic model that considers an arrival rate of the incoming jobs, the fixed power budget P, and power provided to each of the k computers; and
 a second set of machine-executable instructions for controlling the operating state of each of the k computers based its desired power state so that a total power provided to the k computers does not exceed the fixed power budget P,
 wherein:
  when there is a fixed number N of jobs in the system, said first set of machine-executable instructions includes machine-executable instructions for determining the desired power/frequency state as a function of the magnitude of N; and
  the operating state can be 1) a PowMax state having a maximum power and a maximum speed and 2) a PowMin state having a minimum power and a minimum speed, said first set of machine-executable instructions further including machine-executable instructions for determining whether to run a number n of the k computers at the PowMax state or to run a number m of the k computers at the PowMin state as a function of a ratio of the minimum speed to the minimum power.

18. A machine-readable storage medium containing machine-executable instructions for performing a method of allocating a fixed power budget P among a number k of computers arranged in a system to process incoming jobs collectively, wherein k is greater than one and each of the k computers has an operating state, said machine-executable instructions comprising:
 a first set of machine-executable instructions for determining a desired power state for each of the k computers based on a queuing theoretic model that considers an arrival rate of the incoming jobs, the fixed power budget P, and power provided to each of the k computers; and
 a second set of machine-executable instructions for controlling the operating state of each of the k computers based its desired power state so that a total power provided to the k computers does not exceed the fixed power budget P;
 wherein:
  when there is a fixed number N of jobs in the system, said first set of machine-executable instructions includes machine-executable instructions for determining the desired power/frequency state as a function of the magnitude of N; and
  the operating state can be 1) a PowMax state having a maximum power and a maximum speed, 2) a PowMin state having a minimum power and a minimum speed, and 3) a PowMed state having a power between the minimum power and the maximum power and a speed between the minimum speed and the maximum speed, and the incoming jobs have an arrival rate A, said first set of machine-executable instructions further including machine-executable instructions for determining whether to run a number n of the k computers at the PowMax state or to run a number l of the k computers at the PowMed state as a function of the minimum speed.

19. A system for processing incoming jobs, comprising:
a number k of computers arranged to process incoming jobs collectively, wherein k is greater than one and each of said k computers has an operating state that can be selectively set based on a selecting signal; and
a router designed and configured to:
  receive the incoming jobs;
  determine a desired power state for each of the k computers based on a queuing theoretic model that considers an arrival rate of the incoming jobs, a fixed power budget P, and power provided to each of the k computers;
  provide the selecting signal to each of the k computers based on said queuing theoretic model so that a total power provided to the k computers does not exceed the fixed power budget P; and
  allocate the incoming jobs based on the number of said k computers operating as a result of the application of said queuing theoretic model;
wherein the operating state can be 1) a PowMax state having a maximum power and a maximum speed and 2) a PowMin state having a minimum power and a minimum speed, said router being further designed and configured to determine, as a function of a ratio of the minimum speed to the minimum power, whether to run a number n of said k computers at the PowMax state or to run a number m of said k computers at the PowMin state.

20. A system according to claim 19, wherein said router is further designed and configured to determine the desired power state as a function of a power allocation vector, a workload allocation vector, and the arrival rate.

21. A system according to claim 19, wherein said router is further designed and configured to determine the desired power states as a function of a linear power-frequency relationship of each of the k computers, the arrival rate to the system, and minimum and maximum power levels of each of said k computers.

22. A system according to claim 19, wherein each of said k computers has a power-frequency relationship represented by a power-frequency curve having a slope, said router being further designed and configured to determine the desired power state as a function of a comparison between the ratio and the slope of the power-frequency curve.

23. A system according to claim 22, wherein the incoming jobs have an arrival rate, and said router is further designed and configured to determine the desired power state as a function of the magnitude of the arrival rate.

24. A system for processing incoming jobs, comprising:
a number k of computers arranged to process incoming jobs collectively, wherein k is greater than one and each of said k computers has an operating state that can be selectively set based on a selecting signal; and
a router designed and configured to:
  receive the incoming jobs;
  determine a desired power state for each of the k computers based on a queuing theoretic model that considers an arrival rate of the incoming jobs, a fixed power budget P, and power provided to each of the k computers;
  provide the selecting signal to each of the k computers based on said queuing theoretic model so that a total power provided to the k computers does not exceed the fixed power budget P; and
  allocate the incoming jobs based on the number of said k computers operating as a result of the application of said queuing theoretic model;
wherein the operating state can be 1) a PowMax state having a maximum power and a maximum speed, 2) a PowMin state having a minimum power and a minimum speed, and 3) a PowMed state having a power between the minimum power and the maximum power and a speed between the minimum speed and the maximum speed, and the incoming jobs have an arrival rate, said router being further designed and configured to determine, as a function of the arrival rate, whether to run a number n of said k computers at the PowMax state or to run a number l of said k computers at the PowMed state.

25. A system according to claim 24, wherein each of said k computers has a power-frequency relationship represented by a power-frequency curve, said router being further designed and configured to determine the desired power state as a function of the power-frequency curve.

26. A system for processing incoming jobs, comprising:
a number k of computers arranged to process incoming jobs collectively, wherein k is greater than one and each of said k computers has an operating state that can be selectively set based on a selecting signal; and
a router designed and configured to:
  receive the incoming jobs;
  determine a desired power state for each of the k computers based on a queuing theoretic model that considers an arrival rate of the incoming jobs, a fixed power budget P, and power provided to each of the k computers;
  provide the selecting signal to each of the k computers based on said queuing theoretic model so that a total power provided to the k computers does not exceed the fixed power budget P; and
  allocate the incoming jobs based on the number of said k computers operating as a result of the application of said queuing theoretic model;
wherein:
  for a fixed number N of jobs in the system, said router is further designed and configured to determine the desired power/frequency state as a function of the magnitude of N; and
  the operating state can be 1) a PowMax state having a maximum power and a maximum speed and 2) a PowMin state having a minimum power and a minimum speed, said router being further designed and configured to determine whether to run a number n of said k computers at the PowMax state or to run a number m of said k computers at the PowMin state as a function of a ratio of the minimum speed to the minimum power.

27. A system for processing incoming jobs, comprising:
a number k of computers arranged to process incoming jobs collectively, wherein k is greater than one and each of said k computers has an operating state that can be selectively set based on a selecting signal; and
a router designed and configured to: receive the incoming jobs;
  determine a desired power state for each of the k computers based on a queuing theoretic model that considers an arrival rate of the incoming jobs, a fixed power budget P, and power provided to each of the k computers;

provide the selecting signal to each of the k computers based on said queuing theoretic model so that a total power provided to the k computers does not exceed the fixed power budget P; and allocate the incoming jobs based on the number of said k computers operating as a result of the application of said queuing theoretic model;

wherein:

for a fixed number N of jobs in the system, said router is further designed and configured to determine the desired power/frequency state as a function of the magnitude of N; and the operating state can be 1) a PowMax state having a maximum power and a maximum speed, 2) a PowMin state having a minimum power and a minimum speed, and 3) a PowMed state having a power between the minimum power and the maximum power and a speed between the minimum speed and the maximum speed, and the incoming jobs have an arrival rate, said router is further designed and configured to determine whether to run a number n of said k computers at the PowMax state or to run a number l of said k computers at the PowMed state as a function of the minimum speed.

* * * * *